(12) United States Patent
Hayashi

(10) Patent No.: US 9,311,532 B2
(45) Date of Patent: Apr. 12, 2016

(54) ARTICLE ESTIMATING SYSTEM, ARTICLE ESTIMATING METHOD, AND ARTICLE ESTIMATING PROGRAM

(71) Applicant: RAKUTEN, INC., Shinagawa-ku, Tokyo (JP)

(72) Inventor: Yasuyuki Hayashi, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/369,902

(22) PCT Filed: Apr. 8, 2013

(86) PCT No.: PCT/JP2013/060633
§ 371 (c)(1),
(2) Date: Jun. 30, 2014

(87) PCT Pub. No.: WO2014/020945
PCT Pub. Date: Feb. 6, 2014

(65) Prior Publication Data
US 2015/0003729 A1    Jan. 1, 2015

(30) Foreign Application Priority Data

Jul. 31, 2012 (JP) ................................. 2012-169493

(51) Int. Cl.
| | |
|---|---|
| *G06K 9/34* | (2006.01) |
| *G06K 9/00* | (2006.01) |
| *G06Q 30/06* | (2012.01) |
| *G06K 9/62* | (2006.01) |
| *G06T 7/40* | (2006.01) |

(52) U.S. Cl.
CPC ........ *G06K 9/00483* (2013.01); *G06K 9/00671* (2013.01); *G06K 9/6201* (2013.01); *G06Q 30/06* (2013.01); *G06T 7/408* (2013.01); *G06K 2009/6213* (2013.01); *G06K 2209/01* (2013.01); *G06T 2207/20144* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 6,289,342 B1 * | 9/2001 | Lawrence et al. | |
| 7,702,684 B2 * | 4/2010 | Unz | ............................. 707/758 |
| 2004/0054627 A1 * | 3/2004 | Rutledge | ......................... 705/50 |
| 2007/0143273 A1 * | 6/2007 | Knaus et al. | ...................... 707/3 |

OTHER PUBLICATIONS

"Amazon_com Help Amazon Mobile for the iPhone, iPad, and iPod touch", Amazon.com, www.amazon.com/gp/help/customer/display.html?ie=UTF8 &nodeId=200287200, Jun. 22, 2014.

(Continued)

*Primary Examiner* — Eueng-Nan Yeh
(74) *Attorney, Agent, or Firm* — Sughrue Mion, PLLC

(57) ABSTRACT

A server 2 includes an extraction unit 21, an analysis unit 22, a first estimating unit 24, an information acquisition unit 25 and a second estimating unit 26. The extraction unit 21 extracts an image area for each article. The analysis unit 22 analyzes the image area to acquire analysis information. The first estimating unit 24 narrows down candidates estimated to correspond to the article in the image area based on the analysis information. When the candidates were able to be narrowed down, the information acquisition unit 25 acquires additional information additional information of a reference article. The second estimating unit 26 attempts a narrowing process based on the additional information of the reference article in addition to the analysis information, for the image area including a spine, which is an image area in which candidates were unable to be narrowed down.

8 Claims, 10 Drawing Sheets

(56) References Cited

OTHER PUBLICATIONS

International Search Report of PCT/JP2013/060633, dated May 7, 2013.

English Translation of International Preliminary Report on Patentability dated Feb. 12, 2015 issued in Patent Application No. PCT/JP2013/060633.

* cited by examiner

*Fig.4*

| ISBN | TITLE | AUTHOR | PUBLISHING COMPANY | PUBLICATION YEAR | COVER IMAGE DATA | SIZE | CLASSIFICATION | GENRE |
|---|---|---|---|---|---|---|---|---|
| ISBN 1-1-1 | A A | a | abc | 1990 | A A | VERTICAL A mm<br>HORIZONTAL B mm<br>THICKNESS C mm | SEPARATE VOLUME | LITERATURE/CRITICISM |
| ISBN 2-3-4 | H H | h | pqr | 2000 | H H | VERTICAL D mm<br>HORIZONTAL E mm<br>PAGE NUMBER F | tt library<br>(BACKGROUND COLOR: BLUE) | NONFICTION |
| ISBN 3-5-7 | G G | g | stu | 2010 | G G | VERTICAL G mm<br>HORIZONTAL H mm<br>THICKNESS I mm | nn new book<br>(BACKGROUND COLOR: RED) | ENTERTAINMENT |
| ..... | ..... | ..... | ..... | ..... | ..... | ..... | ..... | ..... |

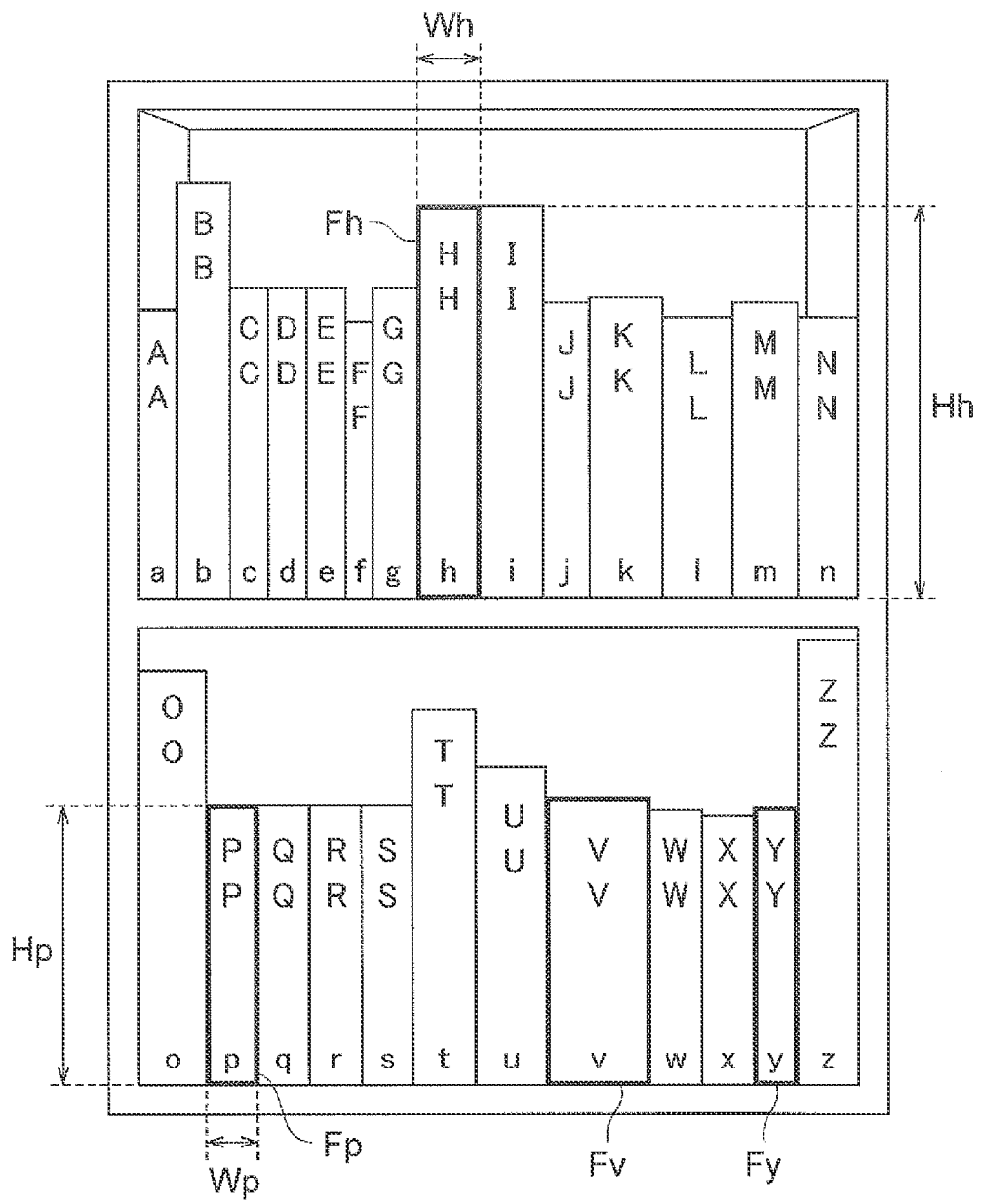

ARTICLE ESTIMATING SYSTEM, ARTICLE ESTIMATING METHOD, AND ARTICLE ESTIMATING PROGRAM

CROSS REFERENCE TO RELATED APPLICATIONS

This application is a National Stage of International Application No. PCT/JP2013/060633 filed Apr. 8, 2013, claiming priority based on Japanese Patent Application No. 2012-169493, filed Jul. 31, 2012, the contents of all of which are incorporated herein by reference in their entirety.

TECHNICAL FIELD

The present invention relates to an article estimating system, an article estimating method and an article estimating program which estimate information for identifying an article from an image including the imaged article.

BACKGROUND ART

Conventionally, when a user photographs a product of interest and transmits a product image to a product sale site, information of the product identified through an image matching process is returned. For example, a service of identifying a book through the image matching process and returning feature information such as a summary and a price of the book to a user terminal when a cover image obtained by photographing a cover of the book is received from the user terminal was performed at an online store in a site described in Non-Patent Literature 1.

CITATION LIST

Non-Patent Literature

[Non-Patent Literature 1]
Amazon.com, "Amazon_com Help Amazon Mobile for the iPhone, iPad, and iPod touch," [online], [searched Jun. 22, 2012], Internet <URL:http://www.amazon.com/gp/help/customer/display.html?ie=UTF8&nodeId=200287200>

SUMMARY OF INVENTION

Technical Problem

Books are often arranged in a state in which their spines are directed to the outside on a bookshelf or the like. Therefore, when the cover image is desired to be transmitted to the above-described site, it is necessary for a user to remove the book and photograph the book in a state in which the book is placed on a flat place in order to photograph the cover of the book. Accordingly, if the book can be identified based on an image of the spine rather than the cover, an effort of the user can be reduced. Further, in this case, the user may also collect and photograph spines of a plurality of books. For example, the user may collect and photograph the plurality of books arranged on the bookshelf without taking the plurality of books off of the bookshelf one by one.

However, in general online stores, spine images are not often stored in a database. In this case, it is not possible to identify (estimate) books through an image matching process. Even when there is an online store in which spine images for some books are stored in a database, it is not possible to estimate books whose spine images have not been stored, through the image matching process. This applies to all articles each having a cover and a spine, such as CDs and DVDs, as well as books.

Therefore, the present invention was made to solve the above problems, and an object of the present invention is to provide an article estimating system, an article estimating method and an article estimating program which are capable of estimating information, such as a title or a product code, for identifying an article such as a book from a spine image of the article.

Solution to Problem

An article estimating system according to an aspect of the present invention is characterized in that the article estimating system is configured to be able to acquire identification information for identifying an article and additional information for the article from a storage means which stores the identification information and the additional information in association with each other for each of a plurality of articles each having a cover and a spine, and includes an image acquisition means which acquires an image including the plurality of articles; an extraction means which extracts, for each article, an image area showing the article from the acquired image; an analysis means which analyzes the plurality of extracted image areas to acquire analysis information; a first estimating means which attempts a process of narrowing down candidates of identification information estimated to correspond to the article in the image area among identification information of the plurality of articles stored in the storage means to a predetermined number or less based on the acquired analysis information, for each of the plurality of image areas; an information acquisition means which acquires additional information for the article of the candidate from the storage means as additional information of a reference article when candidates were able to be narrowed down to a predetermined number or less for the at least one image area by the first estimating means; and a second estimating means which attempts the process of narrowing down candidates of estimated identification information to a predetermined number or less, based on the additional information of the reference article in addition to the analysis information, for the image area including a spine, which is an image area in which candidates were unable to be narrowed down to a predetermined number or less based on the analysis information by the first estimating means when the additional information of the at least one reference article was acquired.

With the article estimating system according to the aspect of the present invention, a process of narrowing down candidates of the identification information estimated to correspond to the article in the image area to a predetermined number or less based on the analysis information obtained by analyzing the image area is attempted. For example, the candidates of the identification information are narrowed down based on the analysis information obtained through image analysis such as OCR (Optical Character Recognition). Accordingly, it is possible to estimate the candidates of the identification information without using an image matching scheme. However, since an area of the image of the spine is small, enough information to narrow down the candidates of the identification information to a predetermined number or less may not be obtained through only the image analysis. Therefore, when the candidates were able to be narrowed down to a predetermined number or less for at least one of a plurality of image areas, additional information of the candidates of the article is acquired as the additional information of the reference article. Also, the estimating process is performed on the image area in which the candidates of the identification information of the article were unable to be estimated through only the analysis of the image area, by additionally using the additional information of the reference article. Accordingly, it is possible to narrow down the candidates of the identification information to a predetermined number or less since the additional information of the other article (reference article) is used for the image area in which the candidates were unable to be estimated. Therefore, it is possible to estimate information, such as a title or a product code, for identifying the article such as a book from the spine image of the article.

In the article estimating system according to another aspect of the present invention, size information indicating a size of a spine of the article may be included in the additional information stored in the storage means, and when the size information of the at least one reference article was acquired, the second estimating means may attempt the process of narrowing down candidates of estimated identification information to a predetermined number or less, based on the size information of the reference article in addition to the analysis information, for the image area including a spine, which is the image area in which the candidates were unable to be narrowed down to a predetermined number or less based on the analysis information by the first estimating means.

In this aspect, when the size information of at least one reference article was acquired, the process of narrowing down candidates of estimated identification information to a predetermined number or less based on the size information of the reference article in addition to the analysis information is attempted for the image area including a spine, which is the image area in which the candidates were unable to be narrowed down to a predetermined number or less based on the analysis information by the first estimating means. Accordingly, the candidates of the estimated identification information are highly likely to be narrowed down to a predetermined number or less based on the size information of the reference article in addition to the analysis information, for the image area in which candidates were unable to be narrowed down to a predetermined number or less based on the analysis information.

In the article estimating system according to another aspect of the present invention, page number information indicating the number of pages of the article may be included in the additional information stored in the storage means, and when the page number information of the at least one reference article was acquired, the second estimating means may attempt the process of narrowing down candidates of estimated identification information to a predetermined number or less, based on a thickness estimated from the page number information of the reference article in addition to the analysis information, for the image area including a spine, which is the image area in which the candidates were unable to be narrowed down to a predetermined number or less based on the analysis information by the first estimating means.

In this aspect, when the page number information of at least one reference article was acquired, the process of narrowing down candidates of estimated identification information to a predetermined number or less based on the thickness estimated from the page number information of the reference article in addition to the analysis information is attempted for the image area including a spine, which is the image area in which the candidates were unable to be narrowed down to a predetermined number or less based on the analysis information by the first estimating means. Accordingly, the candidates of the estimated identification information are highly likely to be narrowed down to a predetermined number or less based on the thickness estimated from the page number information of the reference article in addition to the analysis information, for the image area in which candidates were unable to be narrowed down to a predetermined number or less based on the analysis information.

In the article estimating system according to another aspect of the present invention, series information indicating whether the article constitutes a series with other articles may be included in the additional information stored in the storage means, and when the series information of the at least one reference article was acquired, the second estimating means may attempt the process of narrowing down candidates of estimated identification information to a predetermined number or less, based on the series information of the reference article in addition to the analysis information, for the image area including a spine adjacent to the reference article, which is the image area in which the candidates were unable to be narrowed down to a predetermined number or less based on the analysis information by the first estimating means.

In this aspect, when the series information of at least one reference article was acquired, the process of narrowing down candidates of estimated identification information to a predetermined number or less based on the series information of the reference article in addition to the analysis information is attempted for the image area including a spine adjacent to the reference article, which is the image area in which the candidates were unable to be narrowed down to a predetermined number or less based on the analysis information by the first estimating means. Accordingly, the candidates of the estimated identification information are highly likely to be narrowed down to a predetermined number or less based on the series information of the reference article in addition to the analysis information, for the image area in which candidates were unable to be narrowed down to a predetermined number or less based on the analysis information.

In the article estimating system according to another aspect of the present invention, the second estimating means may compare a degree of discoloration of a background color of the image area in which candidates were able to be narrowed down to a predetermined number or less by the first estimating means with a degree of discoloration of a background color of the image area in which candidates were unable to be narrowed down to a predetermined number or less by the first estimating means, regard an article in the image area having a smaller degree of discoloration as having a newer number, and attempt the process of narrowing down candidates of the estimated identification information to a predetermined number or less.

In this aspect, the degree of discoloration of the image area in which candidates were able to be narrowed down to a predetermined number or less is compared with the degree of discoloration of the image area in which candidates were unable to be narrowed down to a predetermined number or less, the article in the image area having a smaller degree of discoloration is regarded as having a newer number, and the process of narrowing down candidates of the estimated identification information to a predetermined number or less is attempted. Accordingly, it is possible to narrow down the candidates of the identification information using a property that the spine is faded by sunlight over time.

In the article estimating system according to another aspect of the present invention, genre information indicating a genre to which the article belongs may be included in the additional information stored in the storage means, and when the genre information of the at least one reference article was acquired, the second estimating means may attempt the process of narrowing down candidates of estimated identification information to a predetermined number or less, based on the genre information of the reference article in addition to the analysis information, for the image area including a spine adjacent to the reference article, which is the image area in which the candidates were unable to be narrowed down to a predetermined number or less based on the analysis information by the first estimating means.

In this aspect, when the genre information of at least one reference article was acquired, the process of narrowing down candidates of estimated identification information to a predetermined number or less, based on the genre information of the reference article in addition to the analysis information is attempted for the image area including a spine adjacent to the reference article, which is the image area in which the candidates were unable to be narrowed down to a predetermined number or less based on the analysis information by the first estimating means. Accordingly, it is possible to narrow down the candidates using a property that articles belonging to the same genre are placed side by side.

In the article estimating system according to another aspect of the present invention, information of a title and an author of the article may be included in the additional information stored in the storage means, the analysis means may acquire character information as the analysis information by performing an OCR process on the plurality of extracted image areas, and the first estimating means may attempt a process of narrowing down candidates of the identification information estimated to correspond to an article in the image area from among identification information of a plurality of articles stored in the storage means to a predetermined number or less, based on the acquired character information and the stored information of the title and the author.

In this aspect, the character information is acquired as the analysis information by performing the OCR process on the plurality of extracted image areas, and the process of narrowing down candidates of the identification information estimated to correspond to the article in the image area from among identification information of a plurality of articles stored in the storage means to a predetermined number or less based on the acquired character information and the stored information of the title and the author is attempted. Therefore, it is possible to narrow down the candidates with a lower processing load in comparison with performance of the image matching process.

An article estimating method according to an aspect of the present invention is characterized in that the article estimating method is configured so that an article estimating system can acquire identification information for identifying an article and additional information for the article from a storage means which stores the identification information and the additional information in association with each other for each of a plurality of articles each having a cover and a spine, and includes an image acquisition step in which the article estimating system acquires an image including the plurality of articles; an extraction step in which the article estimating system extracts, for each article, an image area showing the article from the acquired image; an analysis step in which the article estimating system analyzes the plurality of extracted image areas to acquire analysis information; a first estimating step in which the article estimating system attempts a process of narrowing down candidates of identification information estimated to correspond to the article in the image area among identification information of the plurality of articles stored in the storage means to a predetermined number or less based on the acquired analysis information, for each of the plurality of image areas; an information acquisition step in which the article estimating system acquires additional information for the article of the candidate from the storage means as additional information of a reference article when candidates were able to be narrowed down to a predetermined number or less for the at least one image area in the first estimating step; and a second estimating step in which the article estimating system attempts the process of narrowing down candidates of estimated identification information to a predetermined number or less, based on the additional information of the reference article in addition to the analysis information, for the image area including a spine, which is an image area in which candidates were unable to be narrowed down to a predetermined number or less based on the analysis information in the first estimating step when the additional information of the at least one reference article was acquired.

With the article estimating method according to the aspect of the present invention, a process of narrowing down candidates of the identification information estimated to correspond to the article in the image area to a predetermined number or less based on the analysis information obtained by analyzing the image area is attempted. For example, the candidates of the identification information are narrowed down based on the analysis information obtained through image analysis such as OCR (Optical Character Recognition). Accordingly, it is possible to estimate the candidates of the identification information without using an image matching scheme. However, since an area of the image of the spine is small, enough information to narrow down the candidates of the identification information to a predetermined number or less may not be obtained through only the image analysis. Therefore, when the candidates were able to be narrowed down to a predetermined number or less for at least one of a plurality of image areas, additional information of the candidates of the article is acquired as the additional information of the reference article. Also, the estimating process is performed on the image area in which the candidates of the identification information of the article were unable to be estimated through only the analysis of the image area, by additionally using the additional information of the reference article. Accordingly, it is possible to narrow down the candidates of the identification information to a predetermined number or less since the additional information of the other article (reference article) is used for the image area in which the candidates were unable to be estimated. Therefore, it is possible to estimate information, such as a title or a product code, for identifying the article such as a book from the spine image of the article.

An article estimating program according to an aspect of the present invention is characterized in that the article estimating program is configured so that a computer can acquire identification information for identifying an article and additional information for the article from a storage means which stores the identification information and the additional information in association with each other for each of a plurality of articles each having a cover and a spine, and causes the computer to realize: a function of an image acquisition means which acquires an image including the plurality of articles; a function of an extraction means which extracts, for each article, an image area showing the article from the acquired image; a function of an analysis means which analyzes the plurality of extracted image areas to acquire analysis information; a function of a first estimating means which attempts a process of narrowing down candidates of identification information estimated to correspond to the article in the image area among identification information of the plurality of articles stored in the storage means to a predetermined number or less based on the acquired analysis information, for each of the plurality of image areas; a function of an information acquisition means which acquires additional information for the article of the candidate from the storage means as additional information of a reference article when candidates were able to be narrowed down to a predetermined number or less for the at least one image area by the first estimating means; and a function of a second estimating means which attempts the process of narrowing down candidates of estimated identification information to a predetermined number or less, based on the additional information of the reference article in addition to the analysis information, for the image area including a spine, which is an image area in which candidates were unable to be narrowed down to a predetermined number or less based on the analysis information by the first estimating means when the additional information of the at least one reference article was acquired.

With the article estimating program according to the aspect of the present invention, a process of narrowing down candidates of the identification information estimated to correspond to the article in the image area to a predetermined number or less based on the analysis information obtained by analyzing the image area is attempted. For example, the candidates of the identification information are narrowed down based on the analysis information obtained through image analysis such as OCR (Optical Character Recognition). Accordingly, it is possible to estimate the candidates of the identification information without using an image matching scheme. However, since an area of the image of the spine is small, enough information to narrow down the candidates of the identification information to a predetermined number or less may not be obtained through only the image analysis. Therefore, when the candidates were able to be narrowed down to a predetermined number or less for at least one of a plurality of image areas, additional information of the candidates of the article is acquired as the additional information of the reference article. Also, the estimating process is performed on the image area in which the candidates of the identification information of the article were unable to be estimated through only the analysis of the image area, by additionally using the additional information of the reference article. Accordingly, it is possible to narrow down the candidates of the identification information to a predetermined number or less since the additional information of the other article (reference article) is used for the image area in which the candidates were unable to be estimated. Therefore, it is possible to estimate information, such as a title or a product code, for identifying the article such as a book from the spine image of the article.

A computer-readable recording medium according to an aspect of the present invention is characterized in that the computer-readable recording medium is configured so that a computer can acquire identification information for identifying an article and additional information for the article from a storage means which stores the identification information and the additional information in association with each other for each of a plurality of articles each having a cover and a spine, and has an article estimating program for causing the computer to realize: a function of an image acquisition means which acquires an image including the plurality of articles; a function of an extraction means which extracts, for each article, an image area showing the article from the acquired image; a function of an analysis means which analyzes the plurality of extracted image areas to acquire analysis information; a function of a first estimating means which attempts a process of narrowing down candidates of identification information estimated to correspond to the article in the image area among identification information of the plurality of articles stored in the storage means to a predetermined number or less based on the acquired analysis information, for each of the plurality of image areas; a function of an information acquisition means which acquires additional information for the article of the candidate from the storage means as additional information of a reference article when candidates were able to be narrowed down to a predetermined number or less for the at least one image area by the first estimating means; and a function of a second estimating means which attempts the process of narrowing down candidates of estimated identification information to a predetermined number or less, based on the additional information of the reference article in addition to the analysis information, for the image area including a spine, which is an image area in which candidates were unable to be narrowed down to a predetermined number or less based on the analysis information by the first estimating means when the additional information of the at least one reference article was acquired.

With computer-readable recording medium according to the aspect of the present invention, a process of narrowing down candidates of the identification information estimated to correspond to the article in the image area to a predetermined number or less based on the analysis information obtained by analyzing the image area is attempted. For example, the candidates of the identification information are narrowed down based on the analysis information obtained through image analysis such as OCR (Optical Character Recognition). Accordingly, it is possible to estimate the candidates of the identification information without using an image matching scheme. However, since an area of the image of the spine is small, enough information to narrow down the candidates of the identification information to a predetermined number or less may not be obtained through only the image analysis. Therefore, when the candidates were able to be narrowed down to a predetermined number or less for at least one of a plurality of image areas, additional information of the candidates of the article is acquired as the additional information of the reference article. Also, the estimating process is performed on the image area in which the candidates of the identification information of the article were unable to be estimated through only the analysis of the image area, by additionally using the additional information of the reference article. Accordingly, it is possible to narrow down the candidates of the identification information to a predetermined number or less since the additional information of the other article (reference article) is used for the image area in which the candidates were unable to be estimated. Therefore, it is possible to estimate information, such as a title or a product code, for identifying the article such as a book from the spine image of the article.

Advantageous Effects of Invention

According to the present invention, it is possible to provide the article estimating system, the article estimating method and the article estimating program which are capable of estimating information, such as a title or a product code, for identifying the article such as a book from the spine image of the article.

BRIEF DESCRIPTION OF DRAWINGS

FIG. 4 is a table structure diagram illustrating an example of a table structure in an article database 23.

FIG. 5 is an illustrative diagram illustrating an example of a method of estimating identification information of an article in a second estimating unit 26.

DESCRIPTION OF EMBODIMENTS

Hereinafter, preferred embodiments of the present invention will be described in detail with reference to the accompanying drawings. Further, the same or similar elements in the description of the drawings are denoted with the same reference signs, and a repeated description is omitted.

<1> A Configuration of an Article Estimating System

Figure 1:
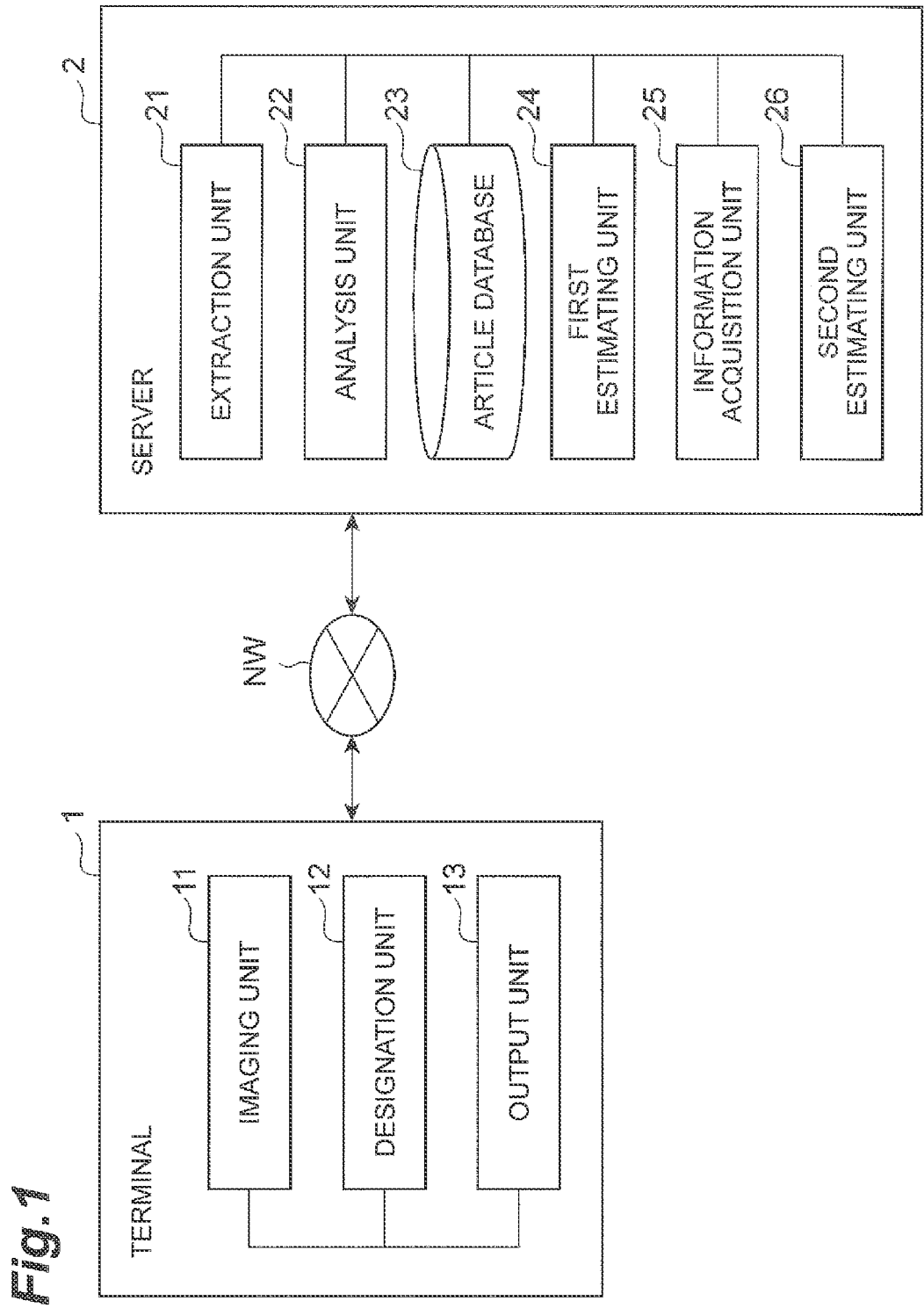
FIG. 1 is a functional configuration diagram illustrating a functional configuration of a server 2 serving as an article estimating system and a terminal 1 capable of communicating with the server 2.
Figure 2:
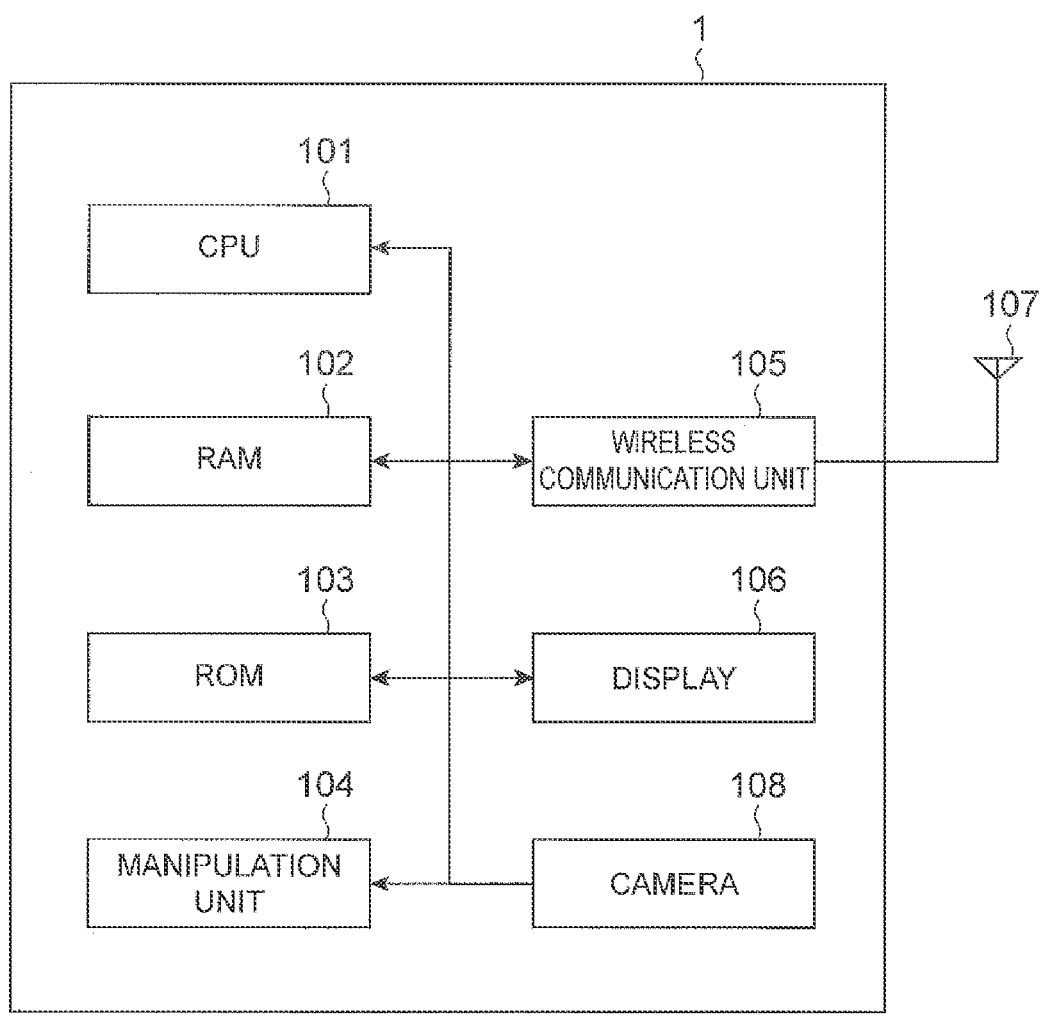
FIG. 2 is a physical configuration diagram illustrating a physical configuration of the terminal 1.
Figure 3:
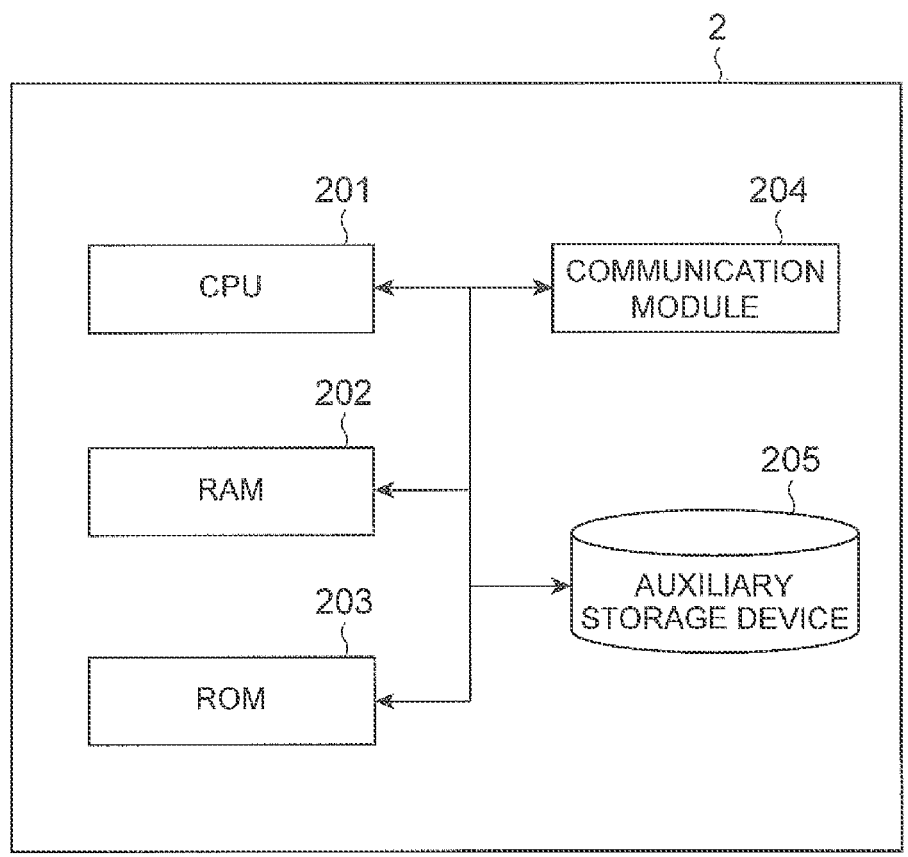
FIG. 3 is a physical configuration diagram illustrating a physical configuration of the server 2.

First, a configuration of a server having an article estimating system according to the present invention mounted thereon will be described with reference to FIGS. 1 to 3. FIG. 1 is a functional configuration diagram illustrating a functional configuration of a server, and a terminal capable of communicating with the server. The server 2 functions as the article estimating system, and is configured to be able to transmit or receive information to or from the terminal 1. The article estimating system is a system which estimates a book from an image including the imaged book. The article estimating system estimates, for example, a title, an ISBN (International Standard Book Number) or the like of the book. Particularly, this article estimating system estimates the book from a spine image as well as the cover image of the book. An estimation target is not limited to the book, and may be, for example, an article having a cover and a spine, such as a DVD package, a CD case, a game software package, or a video package. The estimating process performed by the article estimating system is performed by analyzing an image including an article serving as the estimation target (hereinafter, a target article). When candidates estimated to be the target article were unable to be narrowed down to a predetermined number or less even by image analysis in performing the estimating step, the estimating process is performed based on information obtained from other articles (hereinafter, reference articles) present around the target article. This predetermined number may be one or plurality. Further, FIG. 2 is a physical configuration diagram illustrating a physical configuration of the terminal 1, and FIG. 3 is a physical configuration diagram illustrating a physical configuration of the server 2.

The terminal 1 illustrated in FIG. 1 is a device such as a smartphone, a mobile phone terminal or a laptop personal computer having a camera function. The terminal 1 can communicate with the server 2 through a communication network NW such as a wireless base station or a cable communication network. Therefore, the terminal 1 may transmit an image obtained by imaging the target article such as a book to the server 2. Further, the terminal 1 may receive an area division image indicating a plurality of areas extracted from the image, from the server 2. Further, the terminal 1 can transmit selection information indicating the area of the target article selected from among the plurality of areas by the user to the server 2. Further, the terminal 1 can receive article information (identification information or additional information) indicating the target article included in the selected area and estimated from the server 2.

Further, the server 2 is a device, such as a server or a host computer, which manages data about the article. The server 2 can communicate with the terminal 1 through the communication network NW such as a wireless base station or a cable communication network. Therefore, the server 2 can receive an image obtained by imaging the target article, such as a book, from the terminal 1. Further, the server 2 can transmit the area division image indicating a plurality of areas extracted from the image to the terminal 1. Further, the server 2 can receive the selection information indicating the area selected from among the plurality of areas from the terminal 1. Further, the server 2 can transmit the article information indicating the target article included in the selected area and estimated to the terminal 1.

Next, a configuration of the terminal 1 will be described. The terminal 1 is configured as a computer including hardware such as a CPU (Central Processing Unit) 101 serving as a main physical component, a RAM 102 (Random Access Memory) and a ROM 103 (Read Only Memory) serving as main storage devices, a manipulation unit 104 for manipulating the terminal 1, a communication unit 105 for communication, a display 106 such as a touch panel display, an antenna 107, and a camera 108, as illustrated in FIG. 2. Respective functions of the terminal 1 to be described below are exhibited through operations of these components.

Further, the terminal 1 includes an imaging unit 11, a designation unit 12, and an output unit 13 as main functional components, as illustrated in FIG. 1.

The imaging unit 11 is an imaging processing part which images a plurality of articles such as books, and acquires an image including a plurality of articles. For example, the imaging unit 11 can image a target article having a spine and a reference article present around the target article and acquire an image. For the reference article shown in this image, only a cover of the reference article may be imaged. The imaging unit 11 may acquire the image by imaging the article using a camera mounted on the terminal 1 or may acquire the image through communication with the outside. The imaging unit 11 transmits the acquired image to the server 2.

The designation unit 12 is a selection processing part which generates selection information which designates an image area including the spine of the target article (hereinafter, a spine area) selected by the user and transmits the selection information to the server 2 when receiving an area division image, which will be described below, from the server 2. The area division image is information indicating a plurality of areas extracted from the image. For example, the area division image indicates an area of the reference article and an area of the spine of the target article. When the user taps the terminal 1 and selects one spine area of the target article, the designation unit 12 accepts the selection of the spine area and generates the selection information.

The output unit 13 is an output display unit which receives article information to be described below from the server 2 and outputs the article information such that the article information can be viewed by the user. The article information is information indicating an estimated target article which is included in the spine area selected by the user. When there a plurality of candidates of the target article estimated in this way, the output unit 13 outputs candidate icons or a candidate list of the plurality of target articles. The user can view the article information of the target article desired to be viewed, through selection from among the plurality of candidate icons or the candidate list of the target article. Further, the output unit 13 can display the area division image received from the server 2 such that the area division image can be viewed by the user.

Next, a configuration of the server 2 will be described. The server 2 is configured as a computer including hardware such as a CPU 201 serving as a main physical component, a RAM 202 and a ROM 203, a communication module 204 for communication, and an auxiliary storage device 205 such as a hard disk, as illustrated in FIG. 3. Respective functions of the server 2 to be described below are exhibited by operations of these components.

Further, the server 2 includes an extraction unit 21 (an image acquisition means and an extraction means), an analysis unit 22 (an analysis means), an article database 23 (a storage means), a first estimating unit 24 (a first estimating means), an information acquisition unit 25 (an information acquisition means), and a second estimating unit 26 (a second estimating means).

The extraction unit 21 is an image processing part which receives (acquires) the image from the terminal 1 and extracts an image area showing the article from this image for each article. The extraction unit 21 generates and acquires the area division image in which the plurality of extracted areas are displayed to be superimposed on an original image. Also, the extraction unit 21 transmits the acquired area division image to the terminal 1. Further, a plurality of spine areas in the area division image are shown, for example, by frames Fh, Fp, Fv, and Fy in FIG. 5. For example, the extraction unit 21 can extract a spine area and a cover area of the target article from the image transmitted from the terminal 1 according to the image transmitted from the terminal 1. In this case, the extraction unit 21 can determine whether the extracted rectangular area indicates the spine or the cover based on a ratio of vertical and horizontal sizes of the extracted area.

In the process of extracting this spine area, first, the extraction unit 21 performs an edge emphasis process (e.g., binarizing and high frequency filtering) on image data, and acquires a line in a longitudinal direction (vertical direction). Then, the extraction unit 21 acquires a line (edge) in a lateral direction (horizontal direction). Also, the extraction unit 21 extracts a rectangular area surrounded by the acquired lines in the longitudinal and lateral directions as a spine area corresponding to one article. Further, the extraction unit 21 may recognize the presence of another article in the image at a time point at which different colors of the spine area are detected when the image is scanned in the lateral direction (horizontal direction).

Further, the extraction unit 21 can extract an area of a spine of a reference article and an area of a spine of the target article adjacent to this reference article from the image transmitted from the terminal 1 according to the image transmitted from the terminal 1.

The analysis unit 22 is an image analysis processing part which analyzes the plurality of respective image areas extracted by the extraction unit 21 and generates and acquires analysis information indicating an analysis result. For example, the analysis unit 22 may acquire character information (text information) as an analysis result of an OCR (Optical Character Recognition) process by performing the OCR process on each of the plurality of extracted image areas.

In this case, the analysis unit 22 performs a process of acquiring spine information such as a title or an author from the character information obtained as a result of the OCR process. In the OCR process, the character information indicating a title or an author cannot be completely acquired. However, if there are a plurality of books (which are articles) in the image, at least one book is highly likely to be identified based on the character information or candidates are highly likely to be narrowed down to a predetermined number or less. Further, if candidates of at least one book can be narrowed down based on the character information, other books are highly likely to be narrowed down using information (e.g., physical information such as a size) of the book. The analysis unit 22 extracts spine information from the character information based on a difference in size between characters, a position of a space, or the like.

For example, when "BOKUNIHA WAKARANAI NAKAJIMA MAMO" is described in the spine area, "BOKUNIHA WAKARA?I NAKA? RAMO" is assumed to were acquired as the character information. Here, "?" indicates a place in which character recognition has failed. Also, "BOKUNIHA WAKARA?I" before the position of the space is extracted as a title, and "NAKA? RAMO" after the position of the space is extracted as an author.

The article database 23 is a database which stores, for each of a plurality of articles each having a cover and a spine, identification information for identifying the article and additional information for the article. The additional information includes, for example, size information indicating a size of the spine of the article. The size information is indicated by any representation format, and, for example, is shown as lengths in longitudinal and lateral directions of the spine, lengths in vertical and horizontal directions of the spine, a thickness of the spine, or the like.

Further, for example, page number information, series information, genre information, title and author information, or the like is included in the additional information. The page number information is information indicating the number of pages of the article. The series information is information indicating whether the article constitutes a series with other articles. The series information may be, for example, information indicating whether the article is a book, the article is a series book such as Vol. 1 to Vol. 10, the article constitutes a specific library series, the article constitutes a specific new book series, or the article constitutes first and second volumes. The genre information is information indicating a genre to which the article belongs. Examples of the genre indicated by the genre information include literature, criticism, humanities, thought, society, politics, nonfiction, entertainment, comics, and the like. The title and author information is information indicating a title and an author of the article.

Further, the article database 23 may not be included in the server 2 or may be present outside the server 2. In the case of this configuration, the server 2 may acquire the identification information and the additional information by communicating with the article database 23.

The first estimating unit 24 is a search processing part which attempts a process of narrowing down candidates of identification information estimated to correspond to the article in the image area to a predetermined number or less, for each of the plurality of image areas in the area division image acquired by the extraction unit 21. The first estimating unit 24 attempts the above-described process of narrowing down candidates of identification information among identification information of a plurality of articles stored in the article database 23 to a predetermined number or less, for each of the plurality of image areas, based on the analysis information acquired by the analysis unit 22. Further, the first estimating unit 24 can attempt the above-described process of narrowing down candidates of identification information to a predetermined number or less, based on the character information acquired by the analysis unit 22 and the information of the title and the author stored in the article database 23.

The information acquisition unit 25 is an information acquisition processing part which acquires the additional information for the article of the candidate narrowed down by the first estimating unit 24 from the article database 23. When the candidates were able to be narrowed down to a predetermined number or less for at least one image area by the first estimating unit 24, the information acquisition unit 25 acquires the above-described additional information from the article database 23 as additional information of the reference article. Further, the information acquisition unit 25 may also acquire the additional information for the article of the candidate narrowed down by the second estimating unit 26 from the article database 23. In this case, when the candidates were able to be narrowed down to a predetermined number or less for at least one image area by the second estimating unit 26, the information acquisition unit 25 acquires the above-described additional information from the article database 23.

The second estimating unit 26 is a search processing part which attempts the process of narrowing down candidates of estimated identification information to a predetermined number or less, based on the additional information of the reference article in addition to the above-described area division image, for the image area in which the candidates were unable to be narrowed down by the first estimating unit 24 when the additional information of at least one reference article is acquired by the information acquisition unit 25. The second estimating unit 26 attempts the above-described process of narrowing down candidates of the identification information to a predetermined number or less, for the image area including a spine, which is the image area in which the candidates were unable to be narrowed down to a predetermined number or less based on the area division image by the first estimating unit 24.

Further, when size information of at least one reference article was acquired, the second estimating unit 26 attempts the above-described process of narrowing down candidates of identification information to a predetermined number or less based on the size information of the reference article in addition to the area division image, for the above-described image area in which the candidates were unable to be narrowed down to a predetermined number or less. The size information is information indicating a size of the spine of the article. The size information is, for example, information such as lengths in longitudinal and lateral directions of the spine, lengths in vertical and horizontal directions of the spine, or a thickness of the spine.

More specifically, the second estimating unit 26 attempts the above-described process of narrowing down candidates of the identification information to a predetermined number or less, based on the size information (actual measurement) of the reference article, and a ratio (comparison between images) of a size of the above-described image area in which the candidates were unable to be narrowed down to a predetermined number or less to a size of the image area including the reference article. As an example, the size information (actual measurement) of the reference article is assumed to indicate that the length in the longitudinal direction of the spine is 10 cm.

Further, the size of the image area including the reference article is assumed to be 2 cm. Further, the size of the above-described image area in which candidates were unable to be narrowed down to a predetermined number or less is assumed to be 4 to 5 cm. Accordingly, the above-described ratio is 2 to 2.5. As a result, the second estimating unit 26 estimates that the length in the longitudinal direction of the spine of the article in the above-described image area in which the candidates were unable to be narrowed down to a predetermined number or less is in a range of 20 to 25 cm. Also, the second estimating unit 26 attempts the above-described process of narrowing down candidates of the identification information to a predetermined number or less using a result of this estimation.

Further, when the page number information (actual measurement) of at least one reference article was acquired, the second estimating unit 26 attempts the above-described process of narrowing down candidates of identification information to a predetermined number or less based on a thickness estimated from the page number information of the reference article in addition to the area division image, for the above-described image area in which the candidates were unable to be narrowed down to a predetermined number or less. The page number information is information indicating the number of pages of the article.

More specifically, the second estimating unit 26 attempts the above-described process of narrowing down candidates of the identification information to a predetermined number or less based on the page number information (actual measurement) of the reference article, and a ratio of the thickness of the spine of the article shown in the above-described image area in which the candidates were unable to be narrowed down to the thickness of the spine estimated from the page number information. When the second estimating unit 26 cannot acquire the size information (the thickness of the spine) of the reference article from the article database 23, the second estimating unit 26 estimates the thickness of the spine from the page number information of the reference article. As an example, the page number information of the reference article is assumed to indicate 100 pages.

Further, it is assumed that the thickness of the spine estimated from the page number information was estimated to be 1 to 1.5 cm by the second estimating unit 26. It is also assumed that the thickness of the spine of the article shown in the above-described image area in which the candidates were unable to be narrowed down to a predetermined number or less was estimated to be 3 cm by the second estimating unit 26. Accordingly, the above-described ratio is 2 to 3. As a result, the second estimating unit 26 estimates that the number of pages of the article shown in the above-described image area in which the candidates were unable to be narrowed down to a predetermined number or less is in a range of 200 to 300. Also, the second estimating unit 26 attempts the above-described process of narrowing down candidates of the identification information to a predetermined number or less using a result of this estimation.

Further, when the series information of at least one reference article was acquired, the second estimating unit 26 attempts the above-described process of narrowing down candidates of identification information to a predetermined number or less, based on the series information of the reference article in addition to the area division image, for the image area including the spine adjacent to the reference article, which is the above-described image area in which the candidates were unable to be narrowed down to a predetermined number or less. The series information is information indicating whether the article constitutes a series with other articles.

More specifically, when the series information of the reference article indicates that the article constitutes a series with other articles and when a background color of the spine of the article shown in the above-described image area in which the candidates were unable to be narrowed down to a predetermined number or less is from the same system of colors (in a range shown by the same color name) as the background color of the spine of the reference article, the second estimating unit 26 estimates that these articles constitute the same series. Also, the second estimating unit 26 attempts the above-described process of narrowing down candidates of the identification information to a predetermined number or less using a result of this estimation.

Further, the second estimating unit 26 compares a degree of discoloration of the image area in which the candidates were able to be narrowed down to a predetermined number or less by the first estimating unit 24 with a degree of discoloration of the image area in which the candidates were unable to be narrowed down to a predetermined number or less by the first estimating unit 24. Also, the second estimating unit 26 regards an article in the image area having the smaller degree of discoloration as having a newer number and attempts the above-described process of narrowing down candidates of the identification information to a predetermined number or less. Further, the degree of discoloration is calculated through a comparison with a color of the series stored in the article database 23 ("background color of the spine" to be described below).

For example, the candidate which was able to be narrowed down to a predetermined number or less by the first estimating unit 24 is assumed to be a book of Vol. 5 in a total series of ten books. First, the second estimating unit 26 compares a degree of discoloration of the image area including the book of Vol. 5 with a degree of discoloration of the image area in which the candidates were unable to be narrowed down. The image area including the book of Vol. 5 is assumed to have a smaller degree of discoloration than the image area in which the candidates were unable to be narrowed down. In this case, the second estimating unit 26 regards the book in the image area in which the candidates were unable to be narrowed down as being newer than the book of Vol. 5, which is the candidate which was able to be narrowed down to a predetermined number or less, and being any one of Vol. 6 to Vol. 10, and attempts the above-described process of narrowing down candidates of the identification information to a predetermined number or less.

Further, when the genre information of at least one reference article was acquired, the second estimating unit 26 attempts the above-described process of narrowing down candidates of identification information to a predetermined number or less, based on the genre information of the reference article in addition to the area division image, for the image area including the spine adjacent to the reference article, which is the above-described image area in which the candidates were unable to be narrowed down to a predetermined number or less. The genre information is information indicating a genre to which the article belongs.

More specifically, the second estimating unit 26 estimates the article shown in the image area including the spine adjacent to the reference article, which is the above-described image area in which the candidates were unable to be narrowed down to a predetermined number or less, to belong to the genre indicated by the genre information. Also, the second estimating unit 26 attempts the above-described process of narrowing down candidates of the identification information to a predetermined number or less using a result of this estimation.

Further, the second estimating unit 26 can attempt the above-described process of narrowing down candidates of the identification information to a predetermined number or less based on the character information obtained as a result of the OCR process in the first estimating unit 24.

<2> A Table Structure in the Article Database 23

Next, a table structure in the article database 23 will be described with reference to FIG. 4. FIG. 4 is a table structure diagram illustrating an example of the table structure in the article database 23. Further, while a case in which the article is a book will be described herein, a kind of the article is not particularly limited.

The article database 23 stores an ISBN (identification information) which is information for identifying the book, and additional information for the book in association with each other. Examples of the additional information include a title, an author (copyright holder), a publishing company, a publication year, cover image data, a size (size information such as vertical, horizontal and thickness dimensions, and the number of pages for estimating a thickness of the spine), book classification (series information), and genre (genre information).

Here, the book classification indicates, for example, whether the book is a separate book, constitutes a specific library series such as "tt library" (a background color of a spine: blue), or constitutes a specific new book series such as "nn new book" (a background color of a spine: red). Further, the second estimating unit 26 attempts a process of narrowing down candidates of the identification information to a predetermined number or less based on the information indicating the book classification, for the above-described image area in which the candidates were unable to be narrowed down to a predetermined number or less. The second estimating unit 26 can also attempt the process of narrowing down the candidates of the identification information to a predetermined number or less by estimating the size of the book based on the information indicating the book classification. Further, the second estimating unit 26 can also identify the color of the spine from the book classification when the book classification indicates a series configuration. Further, even when the image of the spine is included in the cover image data, it is difficult to identify an article using an image matching process since the spine area is smaller than the cover area.

<3> An Example of the Method of Narrowing Down Candidates of the Target Article in the Second Estimating Unit 26

Next, an example of the method of narrowing down candidates of the target article in the second estimating unit 26 will be described with reference to FIG. 5. FIG. 5 is an illustrative diagram illustrating an example of a method of estimating identification information of the target article in the second estimating unit 26.

When the size information (additional information) of at least one reference article was acquired, the second estimating unit 26 attempts the above-described process of narrowing down candidates of the identification information to a predetermined number or less based on the size information of the reference article in addition to the area division image, for the above-described image area in which the candidates were unable to be narrowed down to a predetermined number or less. More specifically, the second estimating unit 26 attempts the process of narrowing down candidates of identification information of the target article based on the size information acquired by the information acquisition unit 25, and a ratio of a size of the above-described image area in which the candidates were unable to be narrowed down to a predetermined number or less to the size of the image area including the reference article. For example, the second estimating unit 26 estimates a size of a target article "HH" based on size information (additional information) of a reference article "PP" in an area indicated by the frame Fp, and a ratio of a size of the spine of the target article "HH" shown in the above-described image area in which the candidates were unable to be narrowed down, to a size of an image area including the reference article "PP." For example, actually measured size information of the reference article "PP" is assumed to indicate that the length in the longitudinal direction of the spine is Rp (not illustrated).

Further, the size of the spine (a length in the longitudinal direction of the spine) of the reference article "PP" shown in the above-described image area in which candidates were unable to be narrowed down to a predetermined number or less is assumed to be Hp. Further, the size of the spine (a length in the longitudinal direction of the spine) of the target article "HH" is assumed to be Hh. Accordingly, the above-described ratio becomes Hh/Hp. As a result, the second estimating unit 26 estimates the length in the longitudinal direction of the spine of the target article "HH" to be (Rp×Hh/Hp). Also, the second estimating unit 26 attempts the process of narrowing down the candidates of identification information of the target article using a result of this estimation.

Figure 6:
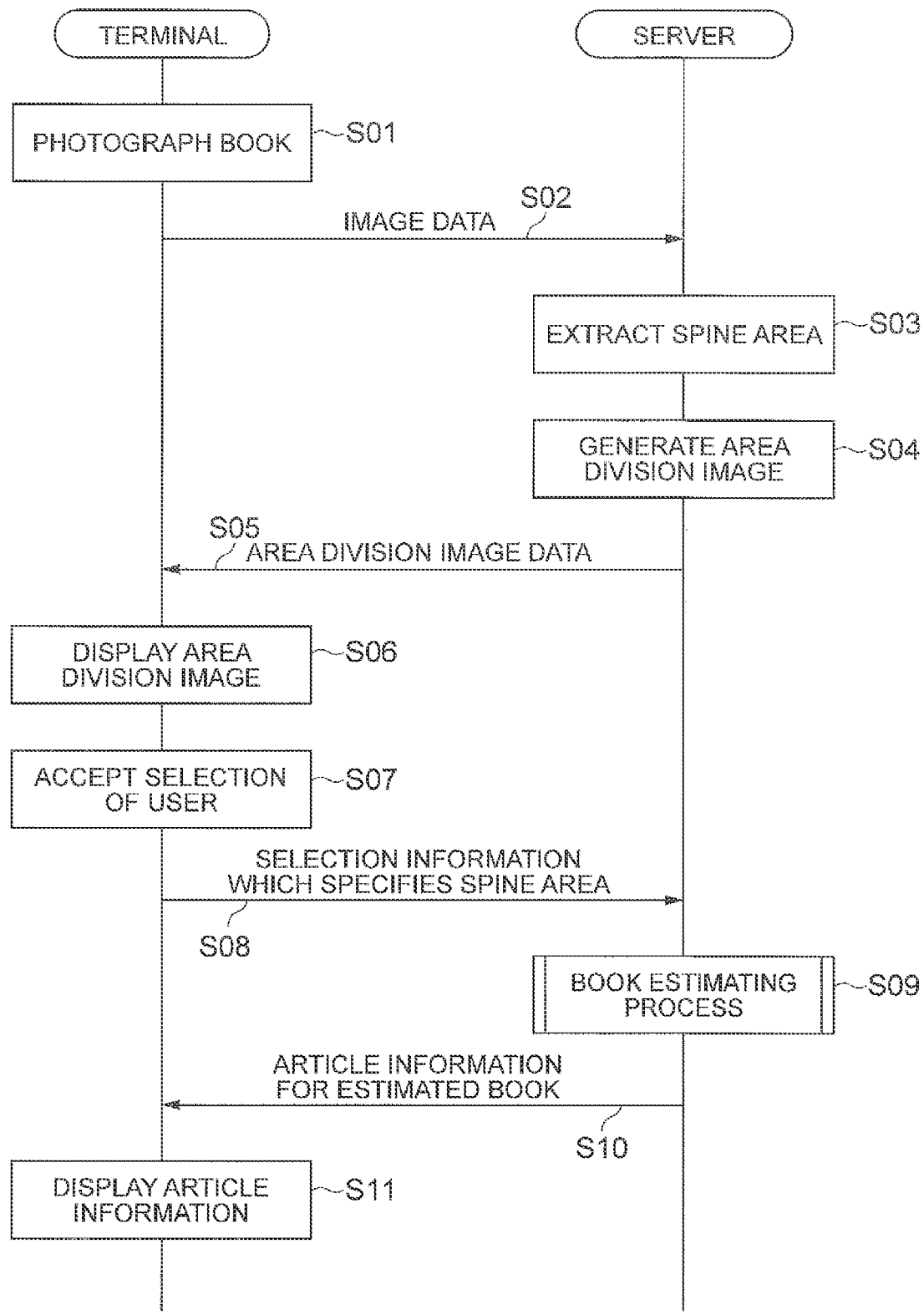
FIG. 6 is a sequence diagram schematically illustrating an entire flow of a series of processes performed by the server 2 serving as an article estimating system.
Figure 7:
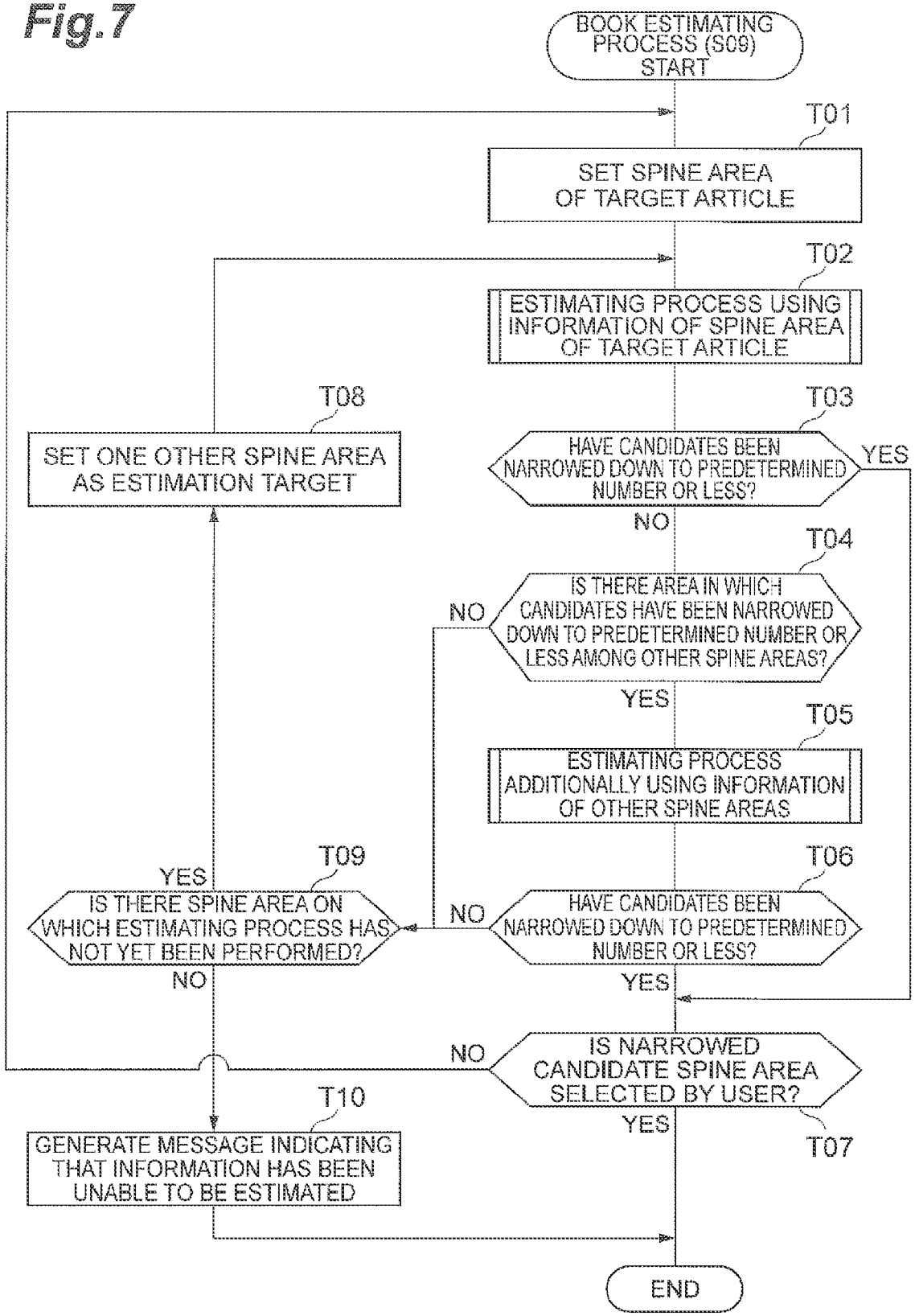
FIG. 7 is a flowchart illustrating a flow of a book estimating process performed by the server 2 serving as an article estimating system.
Figure 8:
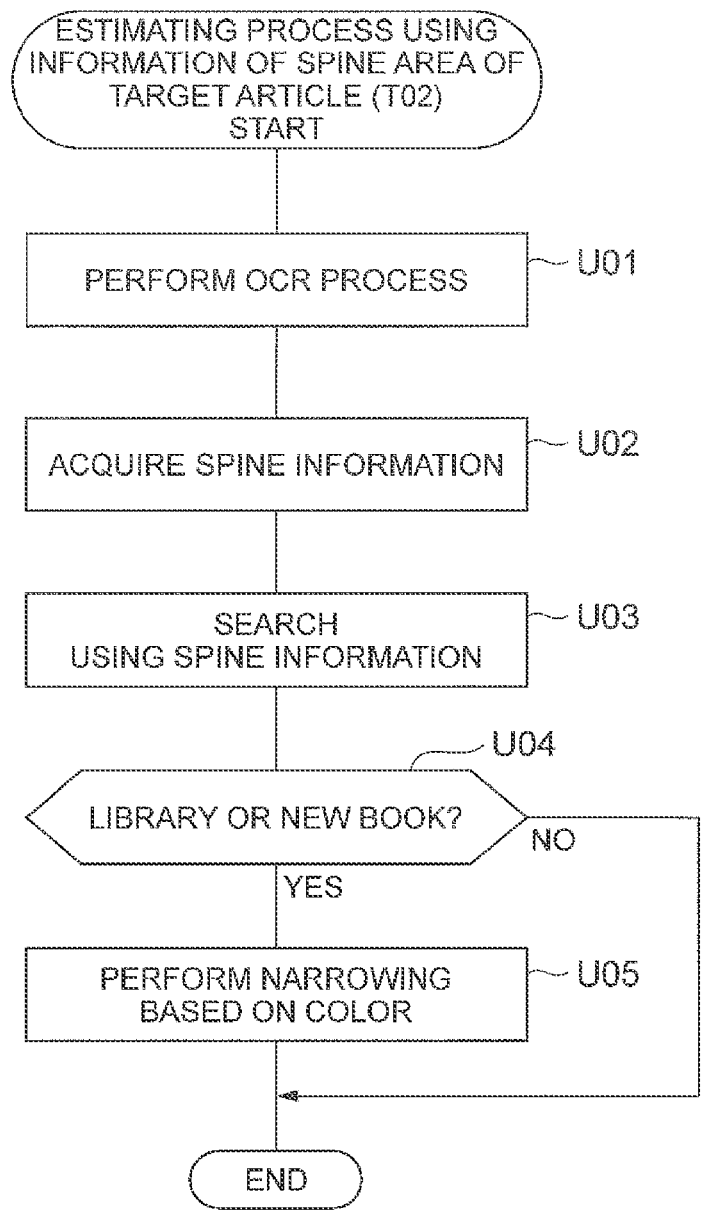
FIG. 8 is a flowchart illustrating an estimating process using information of a spine area of a target article performed by the server 2 serving as an article estimating system.
Figure 9:
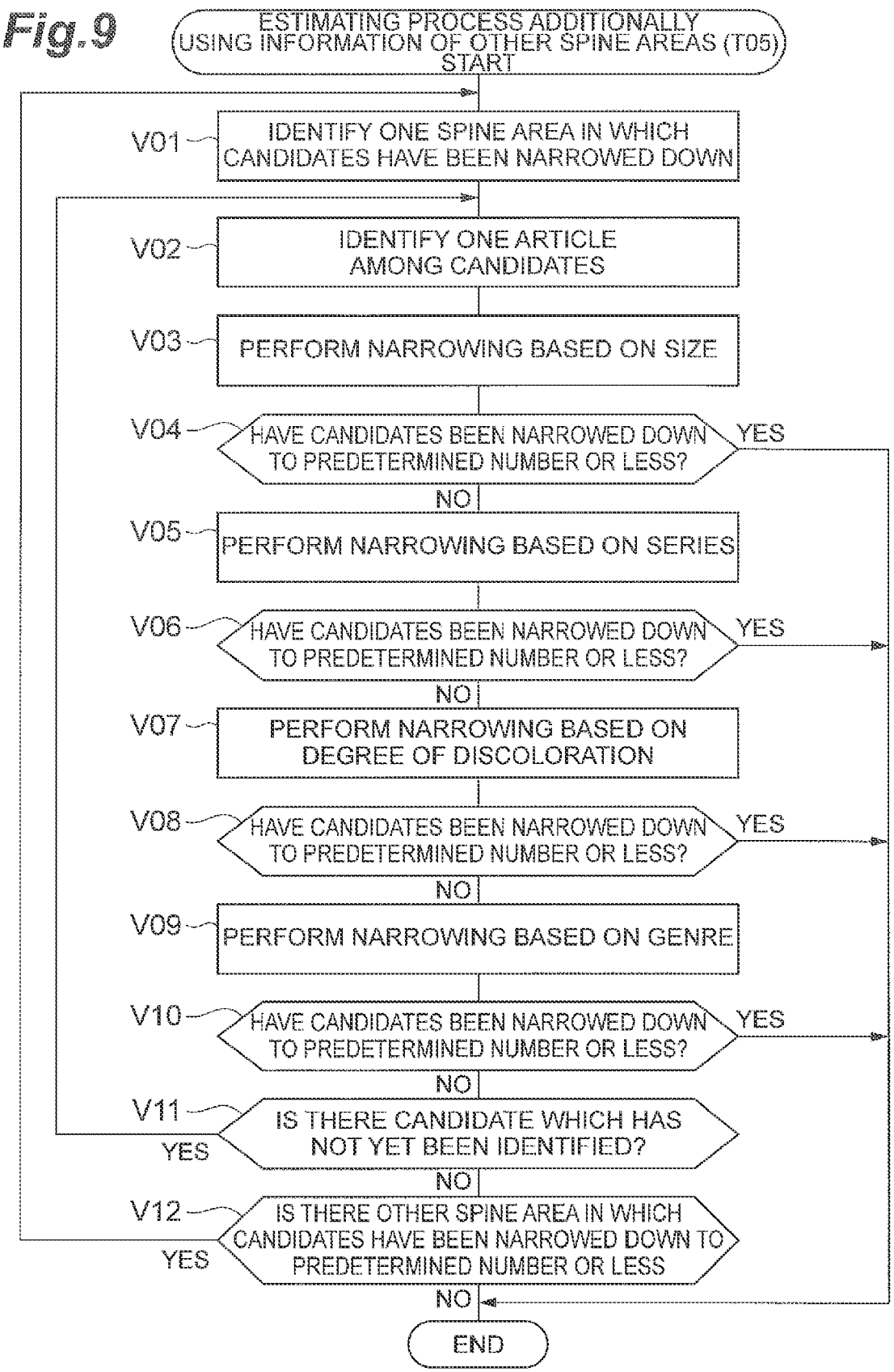
FIG. 9 is a flowchart illustrating an estimating process using information of other spine areas in which candidates were narrowed down to a predetermined number or less, which is performed by the server 2 serving as an article estimating system.

<4> A Flow of a Series of Processes Performed by the Server 2 Serving as an Article Estimating System Next, an example of a flow of a series of processes (article estimating method) performed by the server 2 serving as an article estimating system will be described with reference to FIGS. 6 to 9. A case in which a user acquires article information for identifying a book (article) of concern by imaging the book and transmitting an image to the server 2 will be described. FIG. 6 is a sequence diagram schematically illustrating an entire flow of this series of processes. FIG. 7 is a flowchart illustrating a flow of a process of estimating the book, which is a part of the process in FIG. 6. FIG. 8 is a flowchart illustrating an estimating process using information of the spine area of the target article, which is a part of the process in FIG. 7. FIG. 9 is a flowchart illustrating an estimating process using information of other spine areas narrowed down to a predetermined number or less, which is a part of the process in FIG. 7.

First, the entire flow of a series of processes performed by the server 2 serving as an article estimating system will be described schematically with reference to FIG. 6. First, the terminal 1 photographs a book and acquires an image in response to a manipulation of a user (step S01). For example, the user photographs a plurality of books, including a book of concern at present that he or she desires to check later, using a camera. Further, the user photographs a plurality of books, including a book under consideration for exhibition at an auction, using the camera. Spines of the plurality of books arranged adjacently on a bookshelf are included in the acquired image. Also, the terminal 1 transmits image data to the server 2, and the server 2 receives the image data (step S02; image acquisition step). For each article, the server 2 extracts an image area showing the article from the received image (step S03; extraction step). The spine area of at least one target article is extracted through this extraction process. Also, the server 2 generates an area division image in which the plurality of extracted areas are superimposed on an original image and displayed (step S04). Also, the server 2 transmits area division image data to the terminal 1 (step S05).

The terminal 1 displays the received area division image such that the area division image can be viewed by the user (step S06). Here, when the user taps the terminal 1 to select the area (spine area) of the target article, the terminal 1 accepts the selection of the spine area by the user and generates selection information (step S07). Also, the terminal 1 transmits the selection information for identifying the selected spine area to the server 2 (step S08). The server 2 performs a book estimating process to be described below based on the selected spine area (step S09). When a plurality of books (e.g., three books) were unable to be narrowed down to one book as a result of the estimating process, the plurality of books are output as candidate icons or a candidate list. Also, the server 2 acquires article information for the estimated book (or a plurality of books as candidates as a result of the estimating process), and transmits the article information to the terminal 1 (step S10; information acquisition step). The terminal 1 displays the received article information such that the article information can be viewed by the user (step S11).

Next, the book estimating process performed in step S09 of FIG. 6 will be described with reference to FIG. 7. First, the first estimating unit 24 performs a setting to set one image area including a spine among a plurality of image areas in the area division image acquired by the extraction unit 21 as a spine area, which is a target of the book estimating process (step T01). Also, the first estimating unit 24 performs an estimating process using the information of the spine area of the target article, which will be described below (step T02). Further, in the estimating process in step T02, information obtained from the reference article is not used. Also, the first estimating unit 24 determines whether candidates estimated to correspond to the article in the image area were narrowed down to a predetermined number or less (e.g., two books) (step T03). When the candidates were narrowed down to a predetermined number or less, the process proceeds to step T07 to be described below. On the other hand, when the candidates have not been narrowed down to a predetermined number or less, the process proceeds to step T04 to be described below.

In step T04, the first estimating unit 24 determines whether there is the spine area in which the candidates were narrowed down to a predetermined number or less by the first estimating unit 24 or the second estimating unit 26 among the other spine areas not set in step T01. Further, when there is the spine area in which the candidates were narrowed down to a predetermined number or less by the first estimating unit 24 among the other spine areas, the information acquisition unit 25 has already acquired additional information for the corresponding article from the article database 23. When there is the spine area in which the candidates were narrowed down to a predetermined number or less, the process proceeds to step T05 to be described later. On the other hand, when there is no spine area in which the candidates were narrowed down to a predetermined number or less, the process proceeds to step T09 to be described later.

In step T05, the second estimating unit 26 performs an estimating process additionally using information of other spine areas narrowed down to a predetermined number or less (a second estimating step), which will be described below. Also, the process proceeds to step T06 to be described later.

In step T06, the second estimating unit 26 determines whether the candidates estimated to correspond to the article in the image area were narrowed to a predetermined number or less. When the candidates estimated to correspond to the article in the image area were narrowed to a predetermined number or less, the process proceeds to step T07 to be described below. On the other hand, when the candidates estimated to correspond to the article in the image area have not been narrowed to a predetermined number or less, the process proceeds to step T09 to be described below.

In step T07, the second estimating unit 26 determines whether the narrowed candidate is the spine area indicated by the selection information transmitted from the terminal 1 (i.e., the spine area selected by the user). When the narrowed candidate is not the spine area selected by the user, the process proceeds to step T01 described above. On the other hand, when the narrowed candidate is the spine area selected by the user, the series of processes ends.

In step T09, the first estimating unit 24 determines whether there is the spine area on which the estimating process has not yet been performed. When there is the spine area on which the estimating process has not yet been performed, the process proceeds to step T08 to be described later. On the other hand, when there is no spine area on which the estimating process has not yet been performed, the process proceeds to step T10 to be described later.

In step T08, the first estimating unit 24 selects and sets, as the estimation target, the other spine area not yet set as the estimation target among the plurality of image areas in the area division image acquired by the extraction unit 21, and the process proceeds to step T01 described above. The estimation target selected by the first estimating unit 24 may be the spine area adjacent to the spine area which was selected immediately before, may be the spine area located within the shortest distance, or may be the spine area having a maximum area.

In step T10, the first estimating unit 24 generates a message indicating that the information for identifying the target article selected by the user (i.e., indicated by the selection information) was unable to be estimated, and transmits the message to the terminal 1 so that the message is displayed. Also, the series of processes ends.

Next, an estimating process using the information of the spine area of the target article performed in step T02 of FIG. 7 will be described with reference to FIG. 8. First, the analysis unit 22 performs an OCR process on the image area set as the spine area, which is the target of the book estimating process, and acquires character information (step U01; analysis step). Also, the analysis unit 22 attempts a process of acquiring spine information such as a title or an author from the acquired character information (step U02; analysis step). Then, the first estimating unit 241 searches the article database 23 for the target article corresponding to the acquired spine information, and narrows down the candidates of the target article (step 1103; first estimating step).

Then, the first estimating unit 24 searches the article database 23 for the target article and determines whether the target article belongs to the library series or the new book series (step U04; first estimating step). When the target article belongs to the library series or the new book series, the process proceeds to step U05 which will be described later. On the other hand, when the target article does not belong to the library series or the new book series (i.e., when the target article is a separate volume), the series of processes ends. When the target article is the separate volume, the spine area is relatively greater than that of the library series or the new book series. Therefore, when the target article is the separate volume, precision of the OCR process becomes higher, and candidates estimated to correspond to the article in the image area can be obtained with higher precision.

In step U05, the first estimating unit 24 acquires a background color from the image area set as the spine area which is the target of the book estimating process, searches the article database 23 for the acquired background color, and narrows down the candidates of the identification information of the target article (first estimating step). The first estimating unit 24 narrows down the candidates of the identification information of the target article by determining whether the acquired background color matches a color corresponding to each existing series stored in the article database 23. Also, the series of processes ends.

Next, an estimating process additionally using information of other spine areas in which candidates were narrowed down to a predetermined number or less by the first estimating unit 24 or the second estimating unit 26, which is performed in step T05 of FIG. 7, will be described with reference to FIG. 9. First, the second estimating unit 26 identifies (sets) one spine area in which the candidates were narrowed down to a predetermined number or less among a plurality of other spine areas in which the candidates were narrowed down to a predetermined number or less, and proceeds to step V02 which will be described below (step V01).

In step V02, the second estimating unit 26 identifies (sets) one candidate among candidates of one spine area identified (set) in step V01 (step V02). Then, the second estimating unit 26 performs narrowing based on a size (step V03). Here, it is assumed that there is the spine area in which the candidates were narrowed down to a predetermined number or less by the first estimating unit 24 among the other spine areas. In this case, the information acquisition unit 25 has already acquired additional information (e.g., size information, series information, a degree of discoloration, or genre information) for the article from the article database 23 as the additional information of the reference article. Also, when the size information of at least one reference article was acquired, the second estimating unit 26 attempts the above-described process of narrowing down candidates of identification information to a predetermined number or less based on the size information of the reference article in addition to the above-described area division image, for the above-described image area in which the candidates were unable to be narrowed down to a predetermined number or less in step T03. Specifically, the second estimating unit 26 attempts the above-described process of narrowing down candidates of the identification information to a predetermined number or less based on the real size of the reference article and a ratio of the size of the above-described image area in which the candidates were unable to be narrowed down to a predetermined number or less, to the size of the image area including the reference article.

Also, the second estimating unit 26 determines whether the candidates of the identification information of the target article were narrowed down to a predetermined number or less for the above-described image area in which the candidates were unable to be narrowed down to a predetermined number or less in step T03 (step V04). When the candidates of the identification information of the target article were narrowed down to a predetermined number or less, the series of processes ends. On the other hand, when the candidates of the identification information of the target article have not been narrowed down to a predetermined number or less, the process proceeds to step V05, which will be described below.

In step V05, the second estimating unit 26 performs narrowing based on the series information described above. In other words, when the series information of at least one reference article was acquired, the second estimating unit 26 attempts the above-described process of narrowing down candidates of identification information to a predetermined number or less based on the series information of the reference article in addition to the above-described area division image, for the above-described image area in which the candidates were unable to be narrowed down to a predetermined number or less in step T03. Specifically, when the series information of the reference article indicates that the article constitutes the series with the other articles and when a background color of the spine of the article shown in the above-described image area in which the candidates were unable to be narrowed down to a predetermined number or less is from the same system of colors (in a range shown by the same color name) as the background color of the spine of the reference article, the second estimating unit 26 estimates that these articles constitute the same series. Also, the second estimating unit 26 attempts the above-described process of narrowing down the candidates of the identification information to a predetermined number or less using a result of this estimation.

Also, the second estimating unit 26 determines whether the candidates of the identification information of the target article were narrowed down to a predetermined number or less for the above-described image area in which the candidates were unable to be narrowed down to a predetermined number or less in step T03 (step V06). When the candidates of the identification information of the target article were narrowed down to a predetermined number or less, the series of processes ends. On the other hand, when the candidates of the identification information of the target article have not been narrowed down to a predetermined number or less, the process proceeds to step V07, which will be described below.

In step V07, the second estimating unit 26 performs narrowing based on the degree of discoloration described above. In other words, the second estimating unit 26 compares a degree of discoloration of the image area in which the candidates were able to be narrowed down to a predetermined number or less by the first estimating unit 24 with a degree of discoloration of the above-described image area in which the candidates were unable to be narrowed down to a predetermined number or less in step T03. Also, the second estimating unit 26 regards an article in the image area having the smaller degree of discoloration as having a newer number and attempts the above-described process of narrowing down candidates of the identification information to a predetermined number or less.

Also, the second estimating unit 26 determines whether the candidates of the identification information of the target article were narrowed down to a predetermined number or less for the above-described image area in which the candidates were unable to be narrowed down to a predetermined number or less in step T03 (step V08). When the candidates of the identification information of the target article were narrowed down to a predetermined number or less, the series of processes ends. On the other hand, when the candidates of the identification information of the target article have not been narrowed down to a predetermined number or less, the process proceeds to step V09, which will be described below.

In step V09, the second estimating unit 26 performs narrowing based on the genre information described above. In other words, when the genre information of at least one reference article was acquired, the second estimating unit 26 attempts the above-described process of narrowing down candidates of identification information to a predetermined number or less based on the genre information of the reference article in addition to the above-described area division image, for the above-described image area in which the candidates were unable to be narrowed down to a predetermined number or less in step T03. Specifically, the second estimating unit 26 estimates the article shown in the image area including a spine adjacent to the reference article, which is the above-described image area in which the candidates were unable to be narrowed down to a predetermined number or less, to belong to the genre indicated by the genre information. Also, the second estimating unit 26 attempts the above-described process of narrowing down candidates of the identification information to a predetermined number or less using a result of the estimation. Further, such a process based on the result of the determination as to whether or not the articles are adjacent may be performed only when the second estimating unit 26 identifies the image to be an image captured in a bookstore. The image may be determined to be the image captured in the bookstore based on information input by the user of the terminal 1 or based on positional information tagged on the image corresponding to a position of the bookstore.

Also, the second estimating unit 26 determines whether the candidates of the identification information of the target article were narrowed down to a predetermined number or less for the above-described image area in which the candidates were unable to be narrowed down to a predetermined number or less in step T03 (step V10). When the candidates of the identification information of the target article were narrowed down to a predetermined number or less, the series of processes ends. On the other hand, when the candidates of the identification information of the target article have not been narrowed down to a predetermined number or less, the process proceeds to step V11, which will be described below.

In step V11, the second estimating unit 26 determines whether there is the candidate which has not yet been identified (set) among the candidates of one spine area identified (set) in step V01. When there is the candidate which has not yet been identified (set), the process proceeds to step V02 described above. On the other hand, when there is no candidate which has not yet been identified (set), the process proceeds to step V12, which will be described below.

In step V12, the second estimating unit 26 determines whether there is the spine area which has not yet been identified (set) among a plurality of other spine areas in which the candidates were narrowed down to a predetermined number or less. When there is the other spine area which has not yet been identified (set), the process proceeds to step V01 described above. On the other hand, when there is no other spine area which has not yet been identified (set), the series of processes ends.

<5> A Module Configuration of the Article Estimating Program

Figure 10:
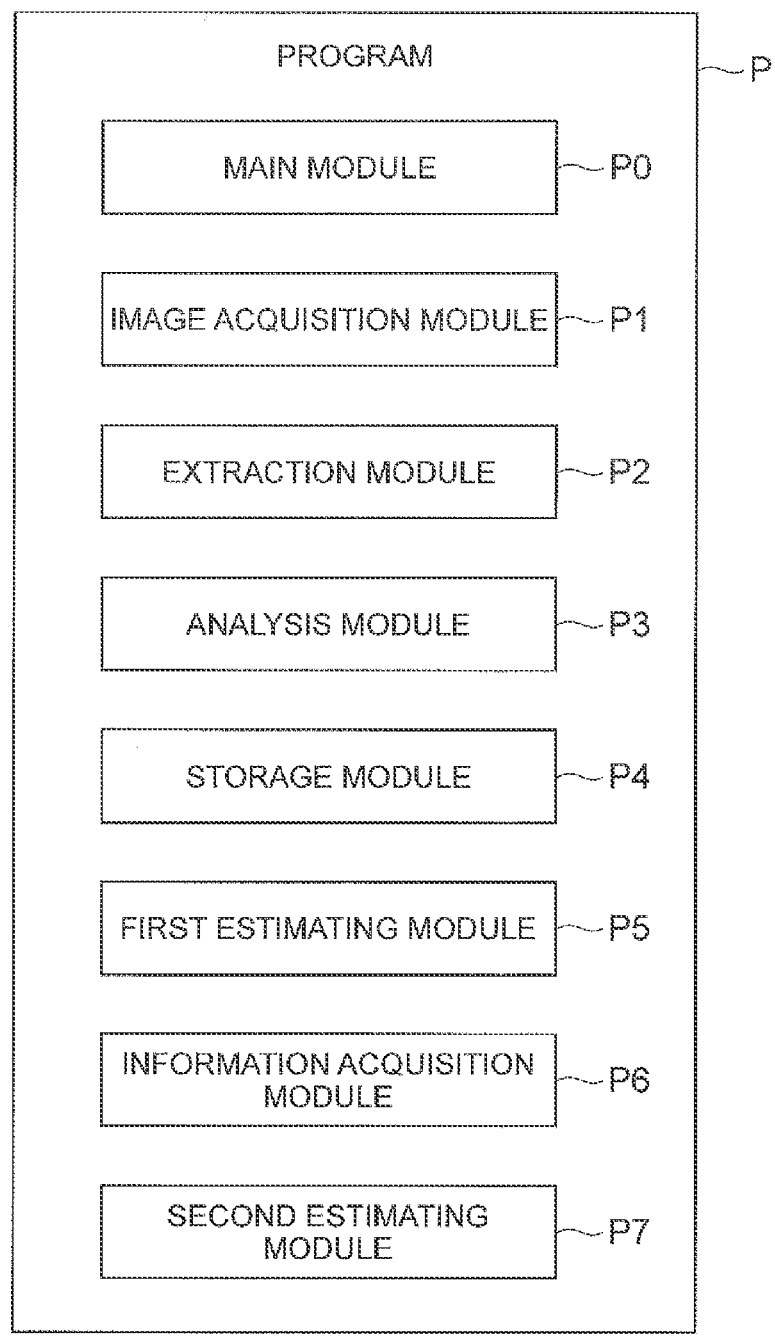
FIG. 10 is a module configuration diagram illustrating a module configuration of an article estimating program P for causing a computer to function as the server 2 which is an article estimating system.

Next, a module configuration of the article estimating program for causing a computer to function as the server 2 having the article estimating system mounted thereon will be described with reference to FIG. 10. FIG. 10 is a module configuration diagram illustrating a module configuration of an article estimating program P for causing a computer to function as the server 2 having the article estimating system mounted thereon.

The article estimating program P includes a main module P0, an image acquisition module P1, an extraction module P2, an analysis module P3, a storage module P4, a first estimating module P5, an information acquisition module P6 and a second estimating module P7, as illustrated in FIG. 10.

The main module P0 is a part which controls an entire function of executing arithmetic processing for various pieces of information. The function of the above-described server 2 is realized by executing the main module P0.

Further, functions realized by executing the image acquisition module P1, the extraction module P2, the analysis module P3, the storage module P4, the first estimating module P5, the information acquisition module P6 and the second estimating module P7 are the same as the respective functions of the extraction unit 21, the analysis unit 22, the article database 23, the first estimating unit 24, the information acquisition unit 25 and the second estimating unit 26.

The article estimating program P is provided, for example, in an aspect in which the article estimating program P is recorded on a recording medium such as a CD-ROM or a DVD-ROM, or a semiconductor memory in a fixed manner. Further, the article estimating program P may be provided as a computer data signal superimposed on carrier waves through a communication network.

<6> Operations and Effects of the Present Invention

According to the server 2 serving as an article estimating system, the process of narrowing down the candidates of the identification information estimated to correspond to the article in the image area to a predetermined number or less based on the area division image obtained by analyzing the image area is attempted. For example, the candidates are narrowed down based on the area division image obtained by image analysis such as OCR (Optical Character Recognition). Accordingly, it is possible to estimate the candidates of the identification information without using an image matching scheme. Further, a processing load is reduced through the OCR process.

However, since an area of the image of the spine is small, sufficient information to narrow down the candidates of the identification information to a predetermined number or less may not be obtained through only the image analysis. Therefore, when the candidates were able to be narrowed down to a predetermined number or less for at least one of a plurality of image areas, additional information of the candidates of the article is acquired as the additional information of the reference article. Also, the estimating process is performed on the image area in which the candidates of the identification information of the article were unable to be estimated through only the analysis of the image area, by additionally using the additional information of the reference article.

Accordingly, it is possible to narrow down the candidates of the identification information to a predetermined number or less since the additional information of the other article (reference article) is used for the image area in which the candidates were unable to be estimated. Therefore, it is possible to estimate information, such as a title or a product code, for identifying the article such as a book from the spine image of the article. As a result, it is possible to estimate the title of the article, such as the book, from the spine image of the article arranged in a state in which the spine is directed outward on the bookshelf.

As a result, if the user photographs a book arranged on a shelf of a real bookstore with a camera and transmits an image of the book, the article information of the book estimated by the server 2 having the article estimating system mounted thereon can be easily acquired online. Some article information offers provide service of enabling trial reading or reading of reviews (comments of other users) of the book. Therefore, the user can also purchase the book (second article) after examining the book using such service.

Further, if the user collects a plurality of books (a first article and a second article) arranged on a shelf at home, photographs the books with a camera, and transmits an image, the user can easily acquire, online, article information of the books which are estimated by the server 2 having the article estimating system mounted thereon. Thus, it is possible to reduce an effort of manually inputting the information of the article when the article information is to be exhibited at auction.

Further, it is preferable for the terminal 1 to store the information of estimated books in association with respective spine areas after the photographed books were estimated. With such a configuration, the user can also view the information of the spine area offline. Further, editing such as movement, deletion and addition of each spine area may be possible.

Further, according to the server 2 having the article estimating system mounted thereon, when the size information of at least one reference article was acquired, the process of narrowing down estimated candidates to a predetermined number or less based on the size information of the reference article in addition to the analysis information, is attempted for the image area including the spine, which is the image area in which the candidates were unable to be narrowed down to a predetermined number or less based on the analysis information by the first estimating unit 24. Accordingly, the estimated candidates are highly likely to be narrowed down to a predetermined number or less based on the size information of the reference article in addition to the area division image, for the image area in which the candidates were unable to be narrowed down to a predetermined number or less based on the area division image.

Further, according to the server 2 having the article estimating system mounted thereon, when the page number information of at least one reference article was acquired, the process of narrowing down estimated candidates to a predetermined number or less based on the thickness estimated from the page number information of the reference article in addition to the area division image is attempted for the image area including the spine, which is the image area in which the candidates were unable to be narrowed down to a predetermined number or less based on the area division image by the first estimating unit 24. Accordingly, the estimated candidates are highly likely to be narrowed down to a predetermined number or less based on the thickness estimated from the page number information of the reference article in addition to the area division image, for the image area in which the candidates were unable to be narrowed down to a predetermined number or less based on the area division image.

Further, according to the server 2 having the article estimating system mounted thereon, when the series information of at least one reference article was acquired, the process of narrowing down estimated candidates to a predetermined number or less based on the series information of the reference article in addition to the area division image is attempted for the image area including the spine adjacent to the reference article, which is the image area in which the candidates were unable to be narrowed down to a predetermined number or less based on the area division image by the first estimating unit 24. Accordingly, the estimated candidates are highly likely to be narrowed down to a predetermined number or less based on the series information of the reference article in addition to the area division image, for the image area in which the candidates were unable to be narrowed down to a predetermined number or less based on the area division image.

Further, according to the server 2 having the article estimating system mounted thereon, the degree of discoloration of the image area in which the candidates were able to be narrowed down to a predetermined number or less is compared with the degree of discoloration of the image area in which the candidates were unable to be narrowed down to a predetermined number or less, the article in the image area having the smaller degree of discoloration is regarded as having a newer number, and the above-described process of narrowing down candidates of the identification information to a predetermined number or less is attempted. Accordingly, it is possible to narrow down the candidates using a property that the spine is faded by sunlight over time.

Further, according to the server 2 having the article estimating system mounted thereon, when the genre information of at least one reference article was acquired, the process of narrowing down estimated candidates to a predetermined number or less based on the genre information of the reference article in addition to the analysis information is attempted for the image area including the spine adjacent to the reference article, which is the image area in which the candidates were unable to be narrowed down to a predetermined number or less based on the analysis information by the first estimating means. Accordingly, it is possible to narrow down the candidates using a property that articles belonging to the same genre are placed side by side.

Further, according to the server 2 having the article estimating system mounted thereon, the character information is acquired as the analysis information by performing the OCR process on the plurality of extracted image areas. Also, the process of narrowing down the candidates estimated to correspond to the article in the image area among the plurality of articles stored in the article database 23 to a predetermined number or less based on the acquired character information and the stored information of the title and the author is attempted. Therefore, it is possible to narrow down the candidates with a lower processing load in comparison with performance of the image matching process.

<7> Variants

In the above-described embodiment, when the genre information of at least one reference article was acquired, the second estimating unit 26 attempts the above-described process of narrowing down candidates of identification information to a predetermined number or less based on the genre information of the reference article in addition to the above-described area division image, for the above-described image area in which the candidates were unable to be narrowed down to a predetermined number or less in step T03, as shown in step V09 of FIG. 9. More specifically, the article shown in the image area including the spine adjacent to the reference article, which is the above-described image area in which the candidates were unable to be narrowed down to a predetermined number or less is estimated to belong to the genre indicated by the genre information. Also, the second estimating unit 26 attempts the above-described process of narrowing down the candidates of the identification information to a predetermined number or less using a result of this estimation. In this regard, the second estimating unit 26 may attempt the above-described process of narrowing down the candidates of the identification information to a predetermined number or less based on the acquired genre information of at least one reference article, and the information on whether the author shown in the above-described image area in which the candidates were unable to be narrowed down to a predetermined number or less and the author of the reference article are the same author. Specifically, when the author shown in the above-described image area in which the candidates were unable to be narrowed down to a predetermined number or less and the author of the reference article are the same author, the target article shown in the image area may be regarded as belonging to the genre indicated by the genre information, and the narrowing process may be attempted.

Further, in the above-described embodiment, the first estimating unit 24 generates the message indicating that the information for identifying the target article selected by the user (i.e., indicated by the selection information) was unable to be estimated, and transmits the message to the terminal 1 so that the message is displayed. In this regard, in a situation in which the estimation of the target article is not possible because the candidates of the reference article are enormous, the target articles are narrowed down to a predetermined number or less through the OCR process before the message is generated, as shown in step T10 of FIG. 7. In this case, when a difference in size between the target article and the reference article (e.g., a size in a longitudinal direction or a size in a lateral direction) is in a predetermined range, the second estimating unit 26 may determine whether the reference article belongs to a library series, a new book series or a separate volume.

In such a configuration, when the reference article is determined to belong to the separate volume, the second estimating unit 26 performs a narrowing search by accessing the article database 23 and searching for a book corresponding to the reference article among books. When the information for identifying the target article was unable to be estimated even through the narrowing search, the first estimating unit 24 generates the message indicating that the information for identifying the target article selected by the user (i.e., indicated by the selection information) was unable to be estimated, and transmits the message to the terminal 1 so that the message is displayed.

On the other hand, when the reference article is determined to belong to the library series or the new book series, the second estimating unit 26 performs a narrowing search by accessing the article database 23 and searching for a book corresponding to the reference article among the library series or the new book series. Further, the second estimating unit 26 identifies the series to which the reference article belongs based on a color of the spine of the reference article and performs the narrowing search again. When the information for identifying the target article was unable to be estimated even through the narrowing search, the first estimating unit 24 generates a message indicating that the information for identifying the target article selected by the user (i.e., indicated by the selection information) was unable to be estimated, and transmits the message to the terminal 1 so that the message is displayed.

Further, the case in which the components of the terminal 1 are the imaging unit 11, the designation unit 12 and the output unit 13, and the components of the server 2 having the article estimating system mounted thereon are the extraction unit 21, the analysis unit 22, the article database 23, the first estimating unit 24, the information acquisition unit 25, and the second estimating unit 26, as illustrated in FIG. 1 was described in the above-described embodiment. However, the arrangement of the components of the article estimating system is not particularly limited and, for example, the components of the terminal 1 may be the imaging unit 11, the designation unit 12, the output unit 13, the extraction unit 21, the analysis unit 22, the first estimating unit 24, the information acquisition unit 25, and the second estimating unit 26.

Further, the extraction unit 21 may be arranged in a device external to the server 2, i.e., in a device included in the article estimating system. Further, the article database 23 may be arranged in a device external to the server 2, i.e., in a device included in the article estimating system.

Further, the imaging target of the imaging unit 11 may not be contained in a bookshelf. Further, the reference article and the target article may not be imaged in a state in which the articles are adjacent to each other.

Further, when the user taps the terminal 1 to select the spine area of the target article, a plurality of spine areas may be selected. Further, when the user taps the terminal 1 to select the spine area of the target article, the user may designate a selection area and select the article within this selection area as the spine area of the target article.

Further, in the above-described embodiment, when the process of estimating the information for identifying the target article using the reference article is performed and the reference articles are not narrowed down to a predetermined number or less, the process of narrowing down separate reference articles different from the reference article to a predetermined number or less is attempted. In this regard, the present invention is not limited to this configuration and, for example, the user may transmit information for identifying the separate reference articles different from the reference article to the server 2 using the terminal 1. Accordingly, the separate reference articles different from the reference article are highly likely to be identified. As a result, the information for identifying the target article is highly likely to be estimated.

Further, while the first estimating unit 24 performs the estimating process using the information of the spine area of the reference article, the cover image may be used rather than the spine image. In this case, it is possible to estimate the information for identifying the reference article using a conventional image matching processing technology. A book placed with its cover directed outward and a book placed with its spine directed outward may be closely arranged and included in one image. In this case, the book as the reference article placed so that its cover is directed outward can be estimated.

Further, while the case in which the process (step S09) of estimating the target article is performed after the selection (step S07) of the spine area by the user, as illustrated in FIG. 6, was described in the above-described embodiment, the process (step S09) of estimating the target article may be performed before the selection (step S07) of the spine area by the user. In this case, the area division image data or a list of pieces of article information of the target article estimated by the spine included in the image may be transmitted to the terminal 1.

In the case of such a configuration, for example, the analysis unit 22 performs the OCR process on all image areas before the selection of the spine area is accepted from the user. Then, the first estimating unit 24 estimates the book in each image area based on the character information obtained through the OCR process. If there is any one image area in which the books of the candidates were narrowed down to one book, information of this book (reference article) is acquired from the article database 23. Also, the second estimating unit 26 performs an estimating process for narrowing down candidates of the identification information estimated to correspond to the article in the image area of the other book, using the acquired information. Thus, the first estimating unit 24 sequentially narrows down the candidates of the identification information of the respective image areas. It is preferable for this estimating process to be performed in ascending order of the number of narrowed candidates of the identification information. It is preferable to use information of a plurality of reference articles when the candidates of the identification information of each image area are narrowed down. In this case, since the book of the target article is estimated using the information of a plurality of other books in the same image, it is possible to more reliably estimate the book corresponding to the target article.

Further, the size in the thickness direction of the article may be used as the size information in place of the size in the vertical direction in the image. In this case, the length in the thickness direction is assumed to be equal to the length in the lateral direction in each image area. However, in order to prevent confusion between the image of the spine and the image of the cover and clearly distinguish the images from each other, the size in the thickness direction of the article may not be used in place of the size in the vertical direction in the image when the length in the thickness direction is equal to or more than twice the lengths in the thickness direction of other articles.

Further, the image captured by the terminal 1 may be a moving image. For example, the user may execute the above estimating process while capturing a moving image of a bookshelf using the camera 108 of the terminal 1. In this case, the captured image is transmitted from the terminal 1 to the server 2 in a predetermined period. The server 2 divides an area of the received image and tracks the area of each image using a well-known technique for tracking an object. Accordingly, the server 2 associates the area selected by the user in the image displayed in the terminal 1 with the analyzed area in the image transmitted to the server 2 before several periods. In other words, the server 2 associates the area selected by the user during the capture of the moving image with the area subjected to the estimating process. Accordingly, the server 2 can provide the terminal 1 with the information indicating the book of the area selected by the user during the capture of the moving image.

INDUSTRIAL APPLICABILITY

According to the present invention, it is possible to estimate the information, such as a title or a product code, for identifying the article such as a book from the spine image of the article.

REFERENCE SIGNS LIST

1 . . . terminal, 2 . . . server, 11 . . . imaging unit, 12 . . . designation unit, 13 . . . output unit, 21 . . . extraction unit, 22 . . . analysis unit, 23 . . . article database, 24 . . . first estimating unit, 25 . . . information acquisition unit, 26 . . . second estimating unit, NW . . . communication network, P . . . article estimating program.

The invention claimed is:

1. An article estimating system configured to be able to acquire identification information for identifying an article and additional information for the article from a storage which stores the identification information and the additional information in association with each other for each of a plurality of articles each having a cover and a spine, the article estimating system comprising:
   at least one memory operable to store program code;
   at least one processor operable to read said program code and operate as instructed by said program code, said program code including:
   image acquisition code which acquires an image including the plurality of articles;
   extraction code which extracts, for each article, an image area showing the article from the acquired image;
   analysis code which analyzes the plurality of extracted image areas to acquire analysis information;
   first estimating code which attempts a process of narrowing down candidates of identification information estimated to correspond to the article in the image area among identification information of the plurality of articles stored in the storage to a predetermined number or less based on the acquired analysis information, for each of the plurality of image areas;
   information acquisition code which acquires additional information for the articles of the candidates from the storage as additional information of at least one reference article when candidates were able to be narrowed down to a predetermined number or less for the at least one image area by the first estimating code; and second estimating code which attempts the process of narrowing down candidates of the estimated identification information to a predetermined number or less, based on the additional information of the at least one reference article in addition to the analysis information when the additional information of the at least one reference article was acquired, for the image area including a spine, which is an image area in which candidates were unable to be further narrowed down to a predetermined number or less based on the analysis information by the first estimating code.

2. The article estimating system according to claim 1, wherein;

size information indicating a size of a spine of the article is included in the additional information stored in the storage, and when the size information of the at least one reference article was acquired, the second estimating code attempts the process of narrowing down candidates of the estimated identification information to a predetermined number or less, based on the size information of the at least one reference article in addition to the analysis information, for the image area including a spine, which is the image area in which the candidates were unable to be narrowed down to a predetermined number or less based on the analysis information by the first estimating code.

3. The article estimating system according to claim 1, wherein:

page number information indicating the number of pages of the article is included in the additional information stored in the storage, and when the page number information of the at least one reference article was acquired, the second estimating code attempts the process of narrowing down candidates of the estimated identification information to a predetermined number or less, based on a thickness estimated from the page number information of the at least one reference article in addition to the analysis information, for the image area including a spine, which is the image area in which the candidates were unable to be narrowed down to a predetermined number or less based on the analysis information by the first estimating code.

4. The article estimating system according to claim 1, wherein:

series information indicating whether the article constitutes a series with other articles is included in the additional information stored in the storage, and when the series information of the at least one reference article was acquired, the second estimating code attempts the process of narrowing down candidates of estimated identification information to a predetermined number or less, based on the series information of the at least one reference article in addition to the analysis information, for the image area including a spine adjacent to the reference article, which is the image area in which the candidates were unable to be narrowed down to a predetermined number or less based on the analysis information by the first estimating code.

5. The article estimating system according to claim 4, wherein the second estimating code compares a degree of discoloration of a background color of the image area in which candidates were able to be narrowed down to a predetermined number or less by the first estimating code with a degree of discoloration of a background color of the image area in which candidates were unable to be narrowed down to a predetermined number or less by the first estimating code, regards an article in the image area having a smaller degree of discoloration as having a newer number, and attempts the process of narrowing down candidates of the estimated identification information to a predetermined number or less.

6. The article estimating system according to claim 1, wherein:

genre information indicating a genre to which the article belongs is included in the additional information stored in the storage, and when the genre information of the at least one reference article was acquired, the second estimating code attempts the process of narrowing down candidates of estimated identification information to a predetermined number or less, based on the genre information of the at least one reference article in addition to the analysis information, for the image area including a spine adjacent to the at least one reference article, which is the image area in which the candidates were unable to be narrowed down to a predetermined number or less based on the analysis information by the first estimating code.

7. The article estimating system according to claim 1, wherein:

information of a title and an author of the article is included in the additional information stored in the storage, the analysis code acquires character information as the analysis information by performing an OCR process on the plurality of extracted image areas, and the first estimating code attempts a process of narrowing down candidates of the identification information estimated to correspond to an article in the image area from among identification information of the plurality of articles stored in the storage to a predetermined number or less, based on the acquired character information and the stored information of the title and the author.

8. An article estimating method configured so that an article estimating system having at least one processor is able to acquire identification information for identifying an article and additional information for the article from a storage which stores the identification information and the additional information in association with each other for each of a plurality of articles each having a cover and a spine, said at least one processor:

acquiring an image including the plurality of articles;

extracting, for each article, an image area showing the article from the acquired image;

analyzing the plurality of extracted image areas to acquire analysis information;

attempting to narrow down candidates of identification information estimated to correspond to the article in the image area among identification information of the plurality of articles stored in the storage to a predetermined number or less based on the acquired analysis information, for each of the plurality of image areas;

acquiring additional information for the articles of the candidates from the storage as additional information of at least one reference article when candidates were able to be narrowed down to a predetermined number or less for the at least one image area; and further attempting to narrow down candidates of the estimated identification information to a predetermined number or less, based on the additional information of the at least one reference article in addition to the analysis information when the additional information of the at least one reference article was acquire, for the image area including a spine, which is an image area in which candidates were unable to be further narrowed down to a predetermined number or less based on the analysis information.

* * * * *